US012804038B2

(12) United States Patent
Lu et al.

(10) Patent No.: US 12,804,038 B2
(45) Date of Patent: Nov. 17, 2026

(54) TRANSACTION PROCESSING METHOD AND DEVICE

(71) Applicant: HUAWEI TECHNOLOGIES CO., LTD., Shenzhen (CN)

(72) Inventors: Gang Lu, Shenzhen (CN); Kun Tan, Beijing (CN); Ying Li, Xi'an (CN); Junying Li, Shenzhen (CN); Chihyung Wang, Beijing (CN); Binzhang Fu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 49 days.

(21) Appl. No.: 18/676,795

(22) Filed: May 29, 2024

(65) Prior Publication Data

US 2024/0314204 A1 Sep. 19, 2024

Related U.S. Application Data

(63) Continuation of application No. PCT/CN2022/133679, filed on Nov. 23, 2022.

(30) Foreign Application Priority Data

Nov. 30, 2021 (CN) ......................... 202111450024.3

(51) Int. Cl.
*G06F 15/167* (2006.01)
*H04L 67/1097* (2022.01)

(52) U.S. Cl.
CPC ................................ *H04L 67/1097* (2013.01)

(58) Field of Classification Search
CPC .......................... H04L 67/1097; H04L 45/254
See application file for complete search history.

(56) References Cited

U.S. PATENT DOCUMENTS 8,244,950 B2 8/2012 Barth et al.
8,402,318 B2 * 3/2013 Nieh .................. G06F 11/3419 717/124

(Continued)

FOREIGN PATENT DOCUMENTS

| | | | |
|---|---|---|---|
| CN | 101146096 | A | 3/2008 |
| CN | 111752685 | A | 10/2020 |
| CN | 113568599 | A | 10/2021 |

OTHER PUBLICATIONS

Khaled Z. Ibrahim; Paul H. Hargrove; Costin Iancu; Katherine Yelick: "An Evaluation of One-Sided and Two-Sided Communication Paradigms on Relaxed-Ordering Interconnect", 2014 IEEE 28th International Parallel and Distributed Processing Symposium, Phoenix, AZ, USA, May 19-23, 2014, total 11 pages.

(Continued)

*Primary Examiner* — Yves Dalencourt
(74) *Attorney, Agent, or Firm* — Slater Matsil, LLP

(57) ABSTRACT

This application discloses a transaction processing method and a device that may be used in the field of network technologies. The method includes: A transmitting device determines a first order flag for a generated first transaction based on service logic of an application, and obtains order auxiliary information of the first transaction. The order flag indicates a dependency relationship (for example, forward dependency and backward blocking) between different transactions. This application does not depend on an operation type of a transaction. A transaction order between transactions may be set, and the receiving device ensures an execution order of each transaction based on an order flag, provided that a transaction relationship is fully expressed. The transaction order is flexibly defined, to meet the requirements of different scenarios and improve processing performance.

20 Claims, 11 Drawing Sheets

(56) References Cited

U.S. PATENT DOCUMENTS

| | | | |
|---|---|---|---|
| 9,348,775 | B2 | 5/2016 | Jandhyam |
| 10,255,210 | B1 | 4/2019 | Bshara et al. |
| 2003/0145136 | A1 | 7/2003 | Tierney et al. |
| 2004/0107306 | A1 | 6/2004 | Barth et al. |
| 2010/0303079 | A1 | 12/2010 | Singhal et al. |
| 2015/0172412 | A1 | 6/2015 | Escriva et al. |
| 2015/0261563 | A1 | 9/2015 | Guerin et al. |
| 2015/0269215 | A1 | 9/2015 | Lehouillier et al. |
| 2017/0185643 | A1* | 6/2017 | Doshi ................. G06F 16/2379 |
| 2018/0373560 | A1 | 12/2018 | Peng et al. |
| 2020/0356497 | A1* | 11/2020 | Lesartre .............. G06F 13/1642 |
| 2020/0394648 | A1* | 12/2020 | Blackshear ............. H04L 63/12 |
| 2021/0263766 | A1 | 8/2021 | Dunajski et al. |

OTHER PUBLICATIONS

Wim Lavrijsen; Costin Iancu: "Application Level Reordering of Remote Direct Memory Access Operations", 2017 IEEE International Parallel and Distributed Processing Symposium, Orlando, FL, USA, May 29-Jun. 2, 2017, total 11 pages.

Lu, Youyou; Shu, Jiwu; Sun, Long; Mutlu, Onur: "Improving the Performance and Endurance of Persistent Memory with Loose-Ordering Consistency", IEEE Transactions on Parallel and Distributed Systems, May 4, 2017, total 15 pages.

Mahesh Wagh, "PCI Express* 3.0 Technology: Device Architecture Optimizations on Intel Platforms", 10 Architect, TCIS006, idf2009 ppt. presentation, Jul. 27, 2009, total 33 pages.

Jasmin Ajanovic, Intel Corporation, PCI Express* (PCIe*) 3.0 Accelerator Features, Nov. 29, 2014, 11 pages.

* cited by examiner

| | | Second transaction | | | |
|---|---|---|---|---|---|
| | | Send | Write | Read | Atomic |
| First transaction | Send | # | # | # | # |
| | Write | # | # | # | # |
| | Read | **F** | **F** | # | **F** |
| | Atomic | **F** | **F** | # | **F** |

TRANSACTION PROCESSING METHOD AND DEVICE

CROSS-REFERENCE TO RELATED APPLICATIONS

This application is a continuation of International Application No. PCT/CN2022/133679, filed on Nov. 23, 2022, which claims priority to Chinese Patent Application No. 202111450024.3, filed on Nov. 30, 2021. The disclosures of the aforementioned applications are hereby incorporated by reference in their entireties.

TECHNICAL FIELD

This application relates to the field of network technologies, and in particular, to a transaction processing method and a device.

BACKGROUND

Currently, a low-latency network mainly uses the remote direct memory access (RDMA) protocol. Transaction types defined in this protocol include three memory semantic transactions (namely, read/write/atomic) and one channel semantic transaction (namely, send). A work task of upper-layer software is usually completed by combining a plurality of transactions. A transaction usually has a dependency relationship with another transaction. For example, a transaction can be executed only after execution of another transaction is completed. The dependency relationship needs to be defined in a specified manner. The transaction is ensured to be executed according to the dependency relationship through collaboration of an initiator and a target of the transaction.

To provide a transaction order (that is, a transaction execution order, which may be briefly referred to as a transaction order) with rich expression capabilities for the upper-layer software, the following method is commonly used in the industry: (1) A strong transaction order is defined. For example, strict order preservation is required between transactions. (2) A weak transaction order is defined. The order between transactions is not required, that is, completely out-of-order. (3) The transaction order between transactions is defined based on operation types of the transactions (also referred to as transaction types). For example, the RDMA defines a transaction order. As shown in FIG. 1, operation types included in the transaction order defined by the RDMA are respectively read, write, send, and atomic. Herein, "#" indicates that an order rule is kept, that is, first sent first executed. For example, to ensure that neither a transmit side nor a receive side is blocked, it is restricted that a transaction whose operation type is write may precede a transaction whose operation type is read, but the transaction whose operation type is read cannot precede the transaction whose operation type is write. Generally, transactions of the same operation type are strictly order-preserving (except atomic). In addition to the foregoing manner, order preservation may be strictly ensured by using a Fence flag. For example, in FIG. 1, "F" indicates that the order rule does not need to be kept when there is no Fence flag. The Fence flag is applied to a transaction, and forms a "fence" for a previous transaction and a subsequent transaction, so that the transaction can be executed only after all previous transactions are completed. In other words, in the manner (3), it is defined based on the operation types that "transactions of a same type are executed in order (except atomic transactions), and an order between transactions of different types is defined item by item (as shown in FIG. 1)", and the dependency relationship between transactions is strengthened by using the Fence flag. To be specific, when a stronger dependency relationship is required, the Fence flag is added to the transaction.

In the foregoing three manners commonly used in the industry, the manner (1) can meet function requirements of all application scenarios, but a process of executing a large quantity of transactions needs to be performed strictly in order. In other words, the strong transaction order can work well in an ideal environment with no packet loss or disorder. However, an actual network environment is usually complex, and performance of the strong transaction order may deteriorate due to a packet loss or a disorder. Particularly, in a scenario with a high packet loss rate or a high network disorder degree (for example, a multipath scenario), retransmission of a large quantity of packets affects transmission efficiency and a task completion time. The manner (2) cannot meet function requirements of many application scenarios. Because a large quantity of application scenarios have specific dependency requirements on the transaction order, most upper-layer software requires an additional mechanism to enhance the "weak transaction order". For example, if the upper-layer software requires a strict transaction order, an ordering operation needs to be performed before the transaction is executed. This process occupies a CPU resource and a memory resource, and increases the transaction completion time. The order between transactions in the manner (3) is defined based on the operation types, and is not flexible and excessively strict. A user needs to follow "the transactions of the same type (except atomic transactions) are order-preserving, and the transactions of different types are executed according to the order defined in FIG. 1". Actually, operations of a same type (such as write or read transactions) are strictly order-preserving. The problem of the manner (3) is the same as that in the manner (2). In addition, the Fence flag blocks all subsequent transactions on the transmit side. As a result, completion times of subsequent transactions each are increased by one round trip time (RTT).

SUMMARY

Embodiments of this application provide a transaction processing method and a device. In the method, a new transaction order marking manner is used. The new transaction order marking manner does not depend on an operation type of a transaction. A transmitting device may independently set a transaction order between transactions based on service logic of an application, and generate order auxiliary information of each transaction, provided that a transaction order relationship is fully expressed. Finally, a receiving device ensures an execution order of each transaction based on an order flag and order auxiliary information of each transaction. In this method, the transaction order is flexibly defined, to meet requirements of different scenarios. Based on the flexible transaction order, resource overheads (for example, a CPU resource and a memory resource) of upper-layer software can be avoided, and performance improvement brought by non-strict order preservation can be obtained when the flexible transaction order is ensured, thereby fully utilizing flexibility and improving processing performance.

In view of this, embodiments of this application provide the following technical solutions:

According to a first aspect, an embodiment of this application first provides a transaction processing method that may be applied to the field of computer low-latency network technologies. The method includes: An application (that is, a transaction initiator) is deployed on a transmitting device. A transaction is generated in real time when the application is run. The transmitting device determines, based on service logic of the application, an order flag (that may be referred to as a first order flag) for each currently generated transaction (that may be referred to as a first transaction). The order flag indicates a dependency relationship between different transactions. In this embodiment of this application, the order flag is a new transaction dependency relationship defined in this application, and does not depend on an operation type of a transaction. After determining the first order flag for the generated first transaction based on the service logic of the application, the transmitting device further obtains order auxiliary information of the first transaction. The order auxiliary information indicates an execution order relationship between the first transaction and n second transactions, where n≥1. The n second transactions are transactions that are generated by the transmitting device based on the service logic of the application and that are different from the first transaction. Message sequence numbers (MSN) of the n second transactions are all less than an MSN of the first transaction. In other words, the second transaction is a previous transaction of the first transaction. The previous transaction means a transaction whose MSN is less than an MSN of a current transaction. In other words, the MSN of the previous transaction is less than the MSN of the current transaction. The MSN may also be briefly referred to as a sequence number. After separately obtaining the first order flag of the first transaction and the order auxiliary information of the first transaction, the transmitting device encapsulates the first transaction, the first order flag, and the order auxiliary information into a packet (that may be referred to as a first packet) at a transport layer, and sends the encapsulated first packet to a receiving device.

In the foregoing implementation of this application, a new transaction order marking manner is used. The new transaction order marking manner does not depend on an operation type of a transaction (if an order between transactions is defined based on operation types of the transactions, a specific dependency relationship is imposed between transactions that have no dependency relationship in an application scenario, thereby affecting overall transaction completion efficiency). The transaction order is not directly determined by a device manufacturer or a software provider. Instead, permission for marking a transaction dependency relationship is opened to an application, and the transmitting device flexibly marks a dependency relationship for each transaction based on actual service logic, thereby improving flexibility. In addition, order auxiliary information of each transaction is further generated. Finally, the receiving device ensures an execution order of each transaction based on an order flag and the order auxiliary information of each transaction. In this method, requirements in different scenarios can be met by flexibly defining the transaction order. Based on the flexible transaction order, resource overheads (for example, a CPU resource and a memory resource) of upper-layer software can be avoided, and performance improvement brought by non-strict order preservation can be obtained when the flexible transaction order is ensured, thereby fully utilizing flexibility and improving processing performance.

In a possible implementation of the first aspect, the defined order flag may include but is not limited to any one of the following: a forward dependent order flag that may be denoted as sync_pre and indicates that the current transaction cannot precede the previous transaction when being executed by the receiving device; a backward blocking order flag that may be denoted as sync_post and indicates that the current transaction cannot be preceded by a subsequent transaction when being executed by the receiving device, where the subsequent transaction means a transaction whose MSN is greater than the MSN of the current matter, that is, the MSN of the subsequent transaction is greater than the MSN of the current transaction; a non-dependent order flag that may be denoted as sync_none and indicates that the current transaction has neither forward dependency nor backward blocking, that is, the current transaction can precede the previous transaction and can also be preceded by the subsequent transaction when being executed by the receiving device; and a strongly dependent order flag that may be denoted as sync_pre_post and indicates that the current transaction has neither forward dependency nor backward blocking, that is, the current transaction cannot precede the previous transaction and cannot be preceded by the subsequent transaction when being executed by the receiving device.

In the foregoing implementation of this application, the existing transaction order is defined either excessively strong or excessively weak. If the transaction order is excessively strong, optimal performance in a complex network cannot be achieved. If the transaction order is excessively weak, additional CPU and memory overheads are introduced in a large quantity of scenarios. Therefore, this application defines a transaction order marking manner with a strong expression capability. A conventional weak order and a conventional strong order can be expressed. In addition, transaction orders between the weak order and the strong order in various service scenarios can be further expressed. By using the order between the weak order and the strong order, performance improvement can be brought for transaction transmission and execution, and a problem of merely the weak order or merely the strong order is avoided. In other words, additional consumption of the CPU resource or the memory resource on the transmitting device side can be avoided, and retransmission and blocking caused by a strict order can be reduced, thereby obtaining higher network transmission efficiency.

In a possible implementation of the first aspect, a manner in which the transmitting device obtains the order auxiliary information of the first transaction may be specifically: obtaining the order auxiliary information based on the MSN of the first transaction and the MSN of the previous transaction with a post order flag (that is, the backward blocking order flag and the strongly dependent order flag). Specifically, it is assumed that there are n previous transactions of the first transaction (that is, the second transactions), and n≥1. In this case, the transmitting device may first determine m candidate order flags from n second order flags corresponding to the n second transactions. The n second order flags are order flags that are determined by the transmitting device for the n generated second transactions based on the service logic of the application. One second order flag corresponds to one second transaction. The candidate order flag includes the backward blocking order flag sync_post or the strongly dependent order flag sync_pre_post. Herein, n≥m≥1. In other words, the m post candidate order flags are selected from the n second order flags corresponding to the n previous transactions of the first transaction. Then, the transmitting device obtains the order auxiliary information based on the MSN of the first transaction and MSNs of m second transactions. The m second transactions may also be referred to as m candidate transactions, and are in a one-to-one correspondence with the m candidate order flags. The m second transactions are m of the n second transactions.

In the foregoing implementation of this application, a specific implementation in which the transmitting device obtains the order auxiliary information of the first transaction is specifically described. The order auxiliary information is used on the receiving device side to assist the receiving device in processing the first transaction. This is implementable.

In a possible implementation of the first aspect, that the transmitting device obtains the order auxiliary information based on the MSN of the first transaction and the MSNs of the m second transactions may be specifically that, when m≥2, the transmitting device determines an MSN from the MSNs of the m second transactions as a target MSN (that may be referred to as a first MSN), for example, may determine an MSN with a largest value from the m MSNs as the first MSN; and uses the MSN of the first transaction and the first MSN as the order auxiliary information.

In the foregoing implementation of this application, an implementation in which the transmitting device obtains the order auxiliary information based on the MSN of the first transaction and the MSNs of the m second transactions is specifically described. During execution, a second transaction corresponding to the first MSN is first executed, and then the first transaction is executed. This has flexibility.

In a possible implementation of the first aspect, a manner in which the transmitting device obtains the order auxiliary information of the first transaction may further be as follows: If the first order flag has a pre flag, that is, when the first order flag is the forward dependent order flag sync_pre or the strongly dependent order flag sync_pre_post, the transmitting device obtains an MSN of each of the n second transactions, and uses the MSN of the first transaction and the MSN of each second transaction (one second transaction corresponds to one MSN, that is, there are the MSNs of the n second transactions in total) as the order auxiliary information.

In the foregoing implementation of this application, another specific implementation in which the transmitting device obtains the order auxiliary information of the first transaction is specifically described. During execution, all the previous transactions (that is, the n second transactions) are first executed, and then the first transaction is executed. This is optional.

In a possible implementation of the first aspect, the transmitting device may encapsulate the first order flag and the order auxiliary information of the first transaction into a packet header of the first packet, and then send the encapsulated first packet to the receiving device. For example, post_msn may indicate the order auxiliary information in the first packet, and (pre, post) may indicate the first order flag. In this embodiment of this application, a transmission engine in the transmitting device may identify an order flag of a to-be-transmitted transaction, and maintain the order auxiliary information, to encapsulate key information of the packet.

In the foregoing implementation of this application, an encapsulation manner of the first order flag and the order auxiliary information is specifically described. This is operable.

In a possible implementation of the first aspect, in an actual application process, a large quantity of applications are accustomed to an RDMA standard interface. An order dependency between transactions is defined based on various RDMA operation types shown in FIG. 1. If the application is not modified, a new transaction order solution cannot be used. Therefore, for this type of applications that still need to use the RDMA standard interface, the new order marking manner defined in this embodiment of this application may be further used to describe an existing commonly used RDMA transaction order. In this case, a manner in which the transmitting device determines the first order flag for the generated first transaction based on the service logic of the application may be as follows: The transmitting device obtains the first transaction through a remote direct memory access RDMA interface, and determines, according to a specification of an RDMA protocol, a first transaction type of the first transaction. Then, the transmitting device determines, based on an execution order of a transaction type specified in the RDMA protocol, the first order flag corresponding to the first transaction type.

In the foregoing implementation of this application, in this embodiment of this application, an original RDMA transaction order based on a transaction type may be further converted, according to a logical rule, in an order marking manner defined in this application. The application that uses the existing RDMA standard interface may perform transaction transmission by using the technical solutions provided in this embodiment of this application without modifying the application. In other words, an order rule for a transaction inherent interface is converted into a newly defined transaction order expression manner in this embodiment of this application. It is proved that the newly defined transaction order in this embodiment of this application has a very flexible expression capability. In addition, it is proved that the existing transaction order rule can use the newly defined transaction order in this embodiment of this application without modifying the application, thereby improving transaction execution efficiency and reducing network traffic.

In a possible implementation of the first aspect, after the transmitting device sends, to the receiving device, the first packet that includes the first order flag and the order auxiliary information, the transmitting device may continue to use, as a new first transaction, a transaction newly generated based on the service logic of the application, and repeatedly perform the foregoing steps. In other words, each new transaction generated on the transmitting device side may be used as a new first transaction on which the foregoing processing is to be performed.

In the foregoing implementation of this application, operations the same as those for the first transaction are performed on each newly generated transaction on the transmitting device side, and the transmitting device continuously performs similar scheduling, to implement transaction processing coherence, thereby improving user experience.

According to a second aspect, an embodiment of this application further provides a transaction processing method. The method includes: A receiving device receives a first packet sent by a transmitting device. The first packet corresponds to a first transaction. The first packet includes a first order flag and order auxiliary information of the first transaction. The first transaction is a transaction generated by the transmitting device based on service logic of an application. The first order flag is an order flag determined by the transmitting device for the first transaction. The order flag indicates a dependency relationship between different transactions. The order auxiliary information indicates an execution order relationship between the first transaction and n second transactions. The n second transactions are transactions that are generated by the transmitting device based on the service logic of the application and that are different from the first transaction. Sequence numbers MSNs of the n second transactions are all less than an MSN of the first transaction. In other words, the second transactions are previous transactions of the first transaction. Then, the receiving device processes the first transaction based on the first order flag and the order auxiliary information. For example, the receiving device may perform an execution condition check based on the first order flag and the order auxiliary information of the first transaction, and process the first transaction based on a check result. Specifically, before executing the first transaction, the receiving device determines whether execution of a previous transaction on which the first transaction depends is completed. When an execution condition is met (that is, execution of the previous transaction on which the first transaction depends is completed), the receiving device executes the first transaction. When an execution condition is not met (that is, execution of the previous transaction on which the first transaction depends is not completed), the receiving device caches the first transaction, and executes the first transaction after execution of the previous transaction on which the first transaction depends is completed; or the receive end device quits execution of the first transaction.

In the foregoing implementation of this application, a new transaction order marking manner is used. The new transaction order marking manner does not depend on an operation type of a transaction (if an order between transactions is defined based on operation types of the transactions, a specific dependency relationship is imposed between transactions that have no dependency relationship in an application scenario, thereby affecting overall transaction completion efficiency). The transaction order is not directly determined by a device manufacturer or a software provider. Instead, permission for marking a transaction dependency relationship is opened to an application, and the transmitting device flexibly marks a dependency relationship for each transaction based on actual service logic, thereby improving flexibility. In addition, order auxiliary information of each transaction is further generated. Finally, the receiving device ensures an execution order of each transaction based on an order flag and the order auxiliary information of each transaction. In this method, requirements in different scenarios can be met by flexibly defining the transaction order. Based on the flexible transaction order, resource overheads (for example, a CPU resource and a memory resource) of upper-layer software can be avoided, and performance improvement brought by non-strict order preservation can be obtained when the flexible transaction order is ensured, thereby fully utilizing flexibility and improving processing performance.

In a possible implementation of the second aspect, the defined order flag may include but is not limited to any one of the following: a forward dependent order flag that may be denoted as sync_pre and indicates that the current transaction cannot precede the previous transaction when being executed by the receiving device; a backward blocking order flag that may be denoted as sync_post and indicates that the current transaction cannot be preceded by a subsequent transaction when being executed by the receiving device, where the subsequent transaction means a transaction whose MSN is greater than the MSN of the current matter, that is, the MSN of the subsequent transaction is greater than the MSN of the current transaction; a non-dependent order flag that may be denoted as sync_none and indicates that the current transaction has neither forward dependency nor backward blocking, that is, the current transaction can precede the previous transaction and can also be preceded by the subsequent transaction when being executed by the receiving device; and a strongly dependent order flag that may be denoted as sync_pre_post and indicates that the current transaction has neither forward dependency nor backward blocking, that is, the current transaction cannot precede the previous transaction and cannot be preceded by the subsequent transaction when being executed by the receiving device.

In the foregoing implementation of this application, the existing transaction order is defined either excessively strong or excessively weak. If the transaction order is excessively strong, optimal performance in a complex network cannot be achieved. If the transaction order is excessively weak, additional CPU and memory overheads are introduced in a large quantity of scenarios. Therefore, this application defines a transaction order marking manner with a strong expression capability. A conventional weak order and a conventional strong order can be expressed. In addition, transaction orders between the weak order and the strong order in various service scenarios can be further expressed. By using the order between the weak order and the strong order, performance improvement can be brought for transaction transmission and execution, and a problem of merely the weak order or merely the strong order is avoided. In other words, additional consumption of the CPU resource or the memory resource on the transmitting device side can be avoided, and retransmission and blocking caused by a strict order can be reduced, thereby obtaining higher network transmission efficiency.

In a possible implementation of the second aspect, the order auxiliary information of the first transaction at least includes any one of the following: (1) the MSN of the first transaction and MSNs of m second transactions, where $n \geq m \geq 1$; (2) when $m \geq 2$, including the MSN of the first transaction and a first MSN, where the first MSN is an MSN determined from MSNs of m second transactions; or (3) when the first order flag is the forward dependent order flag or the strongly dependent order flag, including the MSN of the first transaction and an MSN of each of the n second transactions.

In the foregoing implementation of this application, several cases of the order auxiliary information of the first transaction are specifically described. The order auxiliary information is used on the receiving device side to assist the receiving device in processing the first transaction. This is flexible and optional.

In a possible implementation of the second aspect, for a different first order flag and different order auxiliary information of the first transaction, a manner in which the receiving device processes the first transaction is also different. Specifically, an implementation in which the receiving device processes the first transaction based on the first order flag and the order auxiliary information may be as follows: When the first order flag is the forward dependent order flag sync_pre or the strongly dependent order flag sync_pre_post, that is, when the first order flag has a pre flag, the receiving device determines, based on the order auxiliary information, whether execution of each second transaction is completed, that is, determines whether execution of all the n previous second transactions is completed. If the receiving device determines that execution of all the second transactions is completed, the receiving device executes the first transaction.

In the foregoing implementation of this application, an implementation in which the receiving device processes the first transaction is specifically described. To be specific, if the first transaction carries the pre flag, the receiving device determines whether execution of each previous second transaction is completed; and if execution of each previous second transaction is completed, executes the first transaction. This is operable.

In a possible implementation of the second aspect, if the receiving device determines that execution of each second transaction is not completed, the receiving device executes the first transaction after execution of each second transaction is completed.

In the foregoing implementation of this application, an implementation in which the receiving device processes the first transaction is specifically described. To be specific, if the first transaction carries the pre flag, the receiving device determines whether execution of each previous second transaction is completed; and if execution of each previous second transaction is not completed, executes the first transaction after execution of all the n transactions is completed. This is flexible.

In a possible implementation of the second aspect, an implementation in which the receiving device processes the first transaction based on the first order flag and the order auxiliary information may be further as follows: When the order auxiliary information includes the MSN of the first transaction and the MSNs of the m second transactions, and the first order flag is the backward blocking order flag sync_post or the non-dependent order flag sync_none, the receiving device determines, based on the order auxiliary information, whether execution of all the m second transactions is completed. If the receiving device determines that execution of all the m second transactions is completed, the receiving device executes the first transaction.

In the foregoing implementation of this application, another implementation in which the receiving device processes the first transaction is specifically described. To be specific, if the first transaction does not carry the pre flag (that is, carries post or none), the receiving device determines whether execution of all the m previous second transactions that are of the first transaction and that carry the post order flag (that is, post or pre+post) is completed; and if execution of all the m previous second transactions is completed, performs the first transaction. This is operable.

In a possible implementation of the second aspect, if the receiving device determines that execution of all the m second transactions is not completed, the receiving device executes the first transaction after execution of all the m second transactions is completed.

In the foregoing implementation of this application, another implementation in which the receiving device processes the first transaction is specifically described. To be specific, if the first transaction does not carry the pre flag (that is, carries post or none), the receiving device determines whether execution of all the m previous second transactions that are of the first transaction and that carry the post order flag (that is, post or pre+post) is completed; and if execution of all the m previous second transactions is not completed, performs the first transaction after execution of all the m transactions is completed. This is flexible.

In a possible implementation of the second aspect, an implementation in which the receiving device processes the first transaction based on the first order flag and the order auxiliary information may be further as follows: When the order auxiliary information includes the MSN of the first transaction and the first MSN (one selected from the m MSNs), and the first order flag is the backward blocking order flag sync_post or the non-dependent order flag sync_none, the receiving device determines, based on the order auxiliary information, whether execution of a target second transaction corresponding to the first MSN (for example, an MSN with a largest value in the m MSNs) is completed. If the receiving device determines that execution of the target second transaction is completed, the receiving device executes the first transaction.

In the foregoing implementation of this application, another implementation in which the receiving device processes the first transaction is specifically described. To be specific, if the first transaction does not carry the pre flag (that is, carries post or none), the receiving device determines whether execution of the previous target second transaction that corresponds to the first MSN and that is of the first transaction is completed; and if execution of the previous target second transaction is completed, performs the first transaction. This is operable.

In a possible implementation of the second aspect, if the receiving device determines that execution of the target second transaction is not completed, the receiving device executes the first transaction after execution of the target second transaction is completed.

In the foregoing implementation of this application, another implementation in which the receiving device processes the first transaction is specifically described. To be specific, if the first transaction does not carry the pre flag (that is, carries post or none), the receiving device determines whether execution of the previous target second transaction of the first transaction is completed; and if execution of the previous target second transaction is not completed, performs the first transaction after execution of the target second transaction is completed. This is flexible.

According to a third aspect, an embodiment of this application provides a computer device. The computer device has a function of implementing the method in the first aspect or any one of the possible implementations of the first aspect, or the computer device has a function of implementing the method in the second aspect or any one of the possible implementations of the second aspect. The function may be implemented by hardware, or may be implemented by hardware executing corresponding software. The hardware or the software includes one or more modules corresponding to the function.

According to a fourth aspect, an embodiment of this application provides a computer device. The computer device may include a memory, a processor, and a bus system. The memory is configured to store a program. The processor is configured to invoke the program stored in the memory to perform the method in the first aspect or any one of the possible implementations of the first aspect of the embodiment of this application, or the processor is configured to invoke the program stored in the memory to perform the method in the second aspect or any one of the possible implementations of the second aspect of the embodiment of this application.

According to a fifth aspect, an embodiment of this application provides a computer-readable storage medium. The computer-readable storage medium stores instructions. When the instructions are run on a computer, the computer is enabled to perform the method in any one of the first aspect or the possible implementations of the first aspect, or the computer is enabled to perform the method in any one of the second aspect or the possible implementations of the second aspect.

According to a sixth aspect, an embodiment of this application provides a computer program. When the computer program is run on a computer, the computer is enabled to perform the method in any one of the first aspect or the possible implementations of the first aspect, or the computer is enabled to perform the method in any one of the second aspect or the possible implementations of the second aspect.

According to a seventh aspect, an embodiment of this application provides a chip. The chip includes at least one processor and at least one interface circuit. The interface circuit is coupled to the processor. The at least one interface circuit is configured to: implement receiving and sending functions, and send instructions to the at least one processor. The at least one processor is configured to run a computer program or the instructions. The processor has a function of implementing the method in any one of the first aspect or the possible implementations of the first aspect, or a function of implementing the method in any one of the second aspect or the possible implementations of the second aspect. The function may be implemented by hardware, or may be implemented by software, or may be implemented by a combination of hardware and software. The hardware or the software includes one or more modules corresponding to the foregoing function. In addition, the interface circuit is configured to communicate with another module other than the chip.

DESCRIPTION OF EMBODIMENTS

Figures 1, 2:
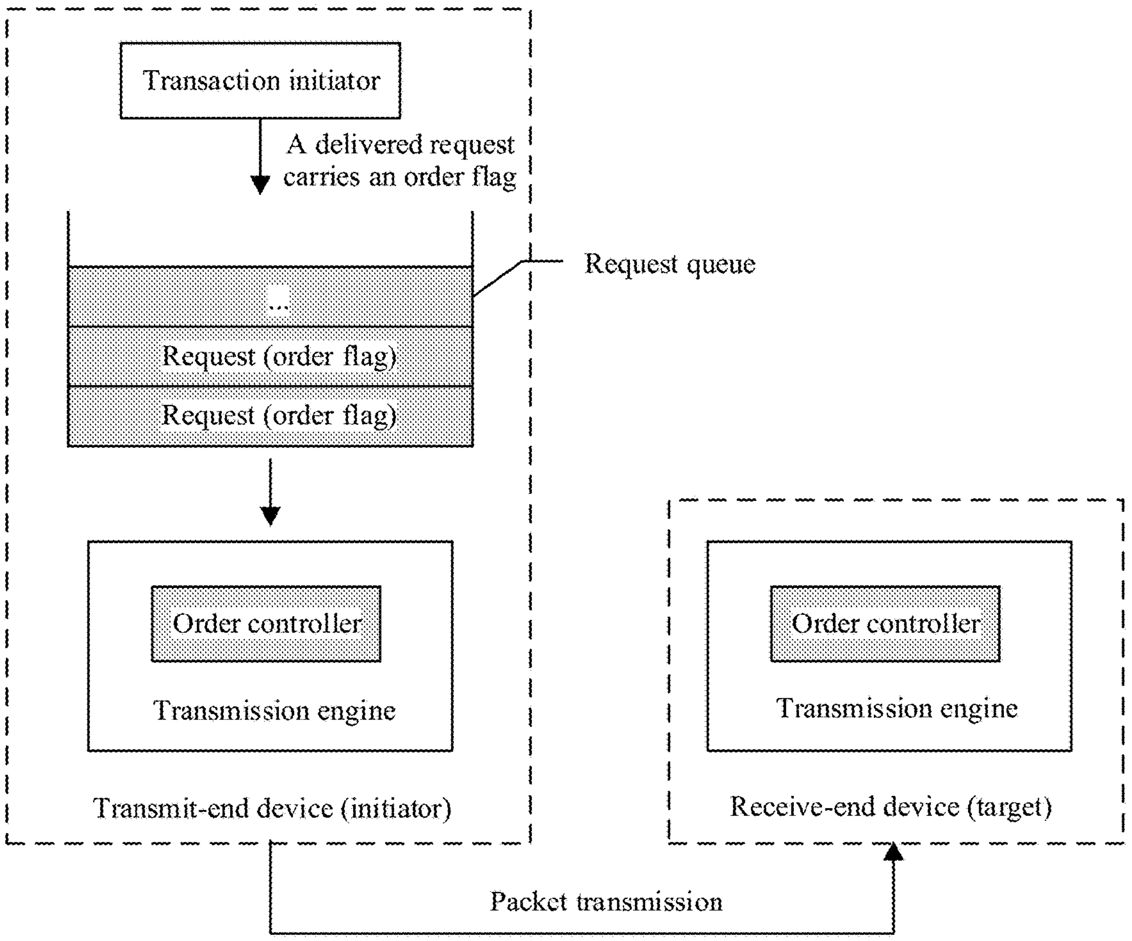
FIG. 1 is a schematic diagram of a set of transaction order execution rules defined by RDMA.
FIG. 2 is a schematic diagram of a system architecture according to an embodiment of this application.

Embodiments of this application provide a transaction processing method and a device. In the method, a new transaction order marking manner is used. The new transaction order marking manner does not depend on an operation type of a transaction. A transmitting device may independently set a transaction order between transactions based on service logic of an application, and generate order auxiliary information of each transaction, provided that a transaction order relationship is fully expressed. Finally, a receiving device ensures an execution order of each transaction based on an order flag and order auxiliary information of each transaction. In this method, the transaction order is flexibly defined, to meet requirements of different scenarios. Based on the flexible transaction order, resource overheads (for example, a CPU resource and a memory resource) of upper-layer software can be avoided, and performance improvement brought by non-strict order preservation can be obtained when the flexible transaction order is ensured, thereby fully utilizing flexibility and improving processing performance.

In the specification, claims, and accompanying drawings of this application, the terms "first", "second", and the like are intended to distinguish between similar objects but do not necessarily indicate a specific order or sequence. It should be understood that the terms used in such a way are interchangeable in appropriate circumstances, and this is merely a discrimination manner for describing objects having a same attribute in embodiments of this application. In addition, the terms "include", "contain", and any other variants mean to cover the non-exclusive inclusion, so that a process, method, system, product, or device that includes a series of units is not necessarily limited to those units, but may include other units not expressly listed or inherent to such a process, method, product, or device.

To better understand the solutions in embodiments of this application, the following first describes terms and concepts that may be used in embodiments of this application. It should be understood that explanations of related concepts may be limited due to specific cases of embodiments of this application, but this does not mean that this application is limited to the specific cases. Specific cases in different embodiments may also vary. This is not specifically limited herein.

(1) Transaction

The transaction is a specific request with an independent meaning. Content of the request may be reading or writing space in a memory, sending a message, or the like.

(2) Operation

The operation is another name of the transaction. One operation may also be referred to as one transaction.

(3) Message Transfer

Message transfer is a general term for a type of data communication method between processes or software components in a computer system. To-be-communicated data is abstracted and encapsulated into a "message". Two or more parties participating in communication implement message transfer between processes or components by invoking primitives such as message sending and receiving, thereby completing data communication.

(4) Data Flow Diagram

The data flow diagram is a graph data structure that expresses a flow direction and a computation relationship of data in computational logic to reflect a design principle and an implementation procedure of the computational logic.

(5) Data Flow Diagram Parameter

In a data flow diagram, a parameter indicates data that is carried by a connection edge of a computing node in the diagram and that is processed by the computing node or fed back by the computing node.

(6) Initiator

The initiator indicates an initiator of a transaction or a sender of a message. In embodiments of this application, the initiator means a transmitting device or related software deployed on a transmitting device.

(7) Target

The target is a remote executor of a transaction or a receiver of a message. In embodiments of this application, the target means a receiving device or related software deployed on a receiving device.

The following describes embodiments of this application with reference to the accompanying drawings. A person of ordinary skill in the art may learn that, with development of technologies and emergence of new scenarios, the technical solutions provided in embodiments of this application are also applicable to a similar technical problem.

First, a system architecture in embodiments of this application is described. For details, refer to FIG. 2. FIG. 2 is a schematic diagram of a system architecture according to an embodiment of this application. The system architecture includes a software module and a hardware module. The software module includes a transaction initiator, that is, a software layer (that is, an application deployed on a transmitting device). An order flag of a newly defined transaction order in this embodiment of this application may be filled by the transaction initiator. Then, the transaction initiator adds an order flag in a transaction delivery request (one transaction is one request). Each transaction generated based on service logic of an application carries one order flag. The hardware module includes an initiator (initiator) transmission engine and a target (target) transmission engine. The initiator transmission engine means a transmission engine on a transmitting device side, may be any device including a transmission engine (not limited to an architecture), and is a sender of a packet corresponding to a transaction, for example, may be an intelligent network interface card based on million instructions per second (million instructions per second, MIPS). The target transmission engine means a transmission engine on a receiving device side, may be any device including a transmission engine (not limited to an architecture), and is a receiver or executor of a packet corresponding to a transaction, for example, may also be an MIPS-based intelligent network interface card.

In this embodiment of this application, a logical (working/connection) relationship between software and hardware is as follows: The transmission engine on the transmitting device side and the transmission engine on the receiving device side are configured to: obtain transactions with order flags one by one from the software module, and initiate transmission based on content of the transactions. Specifically, after adding an order flag to each transaction, the software module may deliver the transaction with the order flag to a request queue; and then the hardware module obtains the transactions with the order flags from the request queue one by one, and initiates transmission based on content of the transactions.

It should be noted that, in some implementations of this application, the transmission engine of the transmitting device further needs to record historical information (that is, order auxiliary information) of some order flags, encapsulate the historical information together with the order flag into a transmission packet header, and transmit the transmission packet header to the transmission engine of the receiving device through a transmission network. Then, the transmission engine of the receiving device determines a specific transaction processing measure based on the order flag and the order auxiliary information. In some implementations of this application, these functions may be implemented by an order controller, for example, may be implemented by an order controller of the transmitting device and an order controller of the receiving device.

It should be further noted that, in this embodiment of this application, the transactions may still be delivered in a queue manner (that is, a first in first out manner); or other transactions with no requirement may be randomly arranged in the request queue after execution logic of the order flags (for example, a current transaction cannot precede a previous transaction) is ensured. This is not specifically limited in this application.

It should be further noted that, in some other implementations of this application, the transaction initiator may be a software module, or may be a hardware module, for example, a CPU or an intelligent network interface card (not limited to an architecture). This is not limited in this application. For ease of description, in this embodiment of this application and subsequent embodiments, an example in which the transaction initiator is a software module is used for description. Details are not described subsequently.

Figure 3:
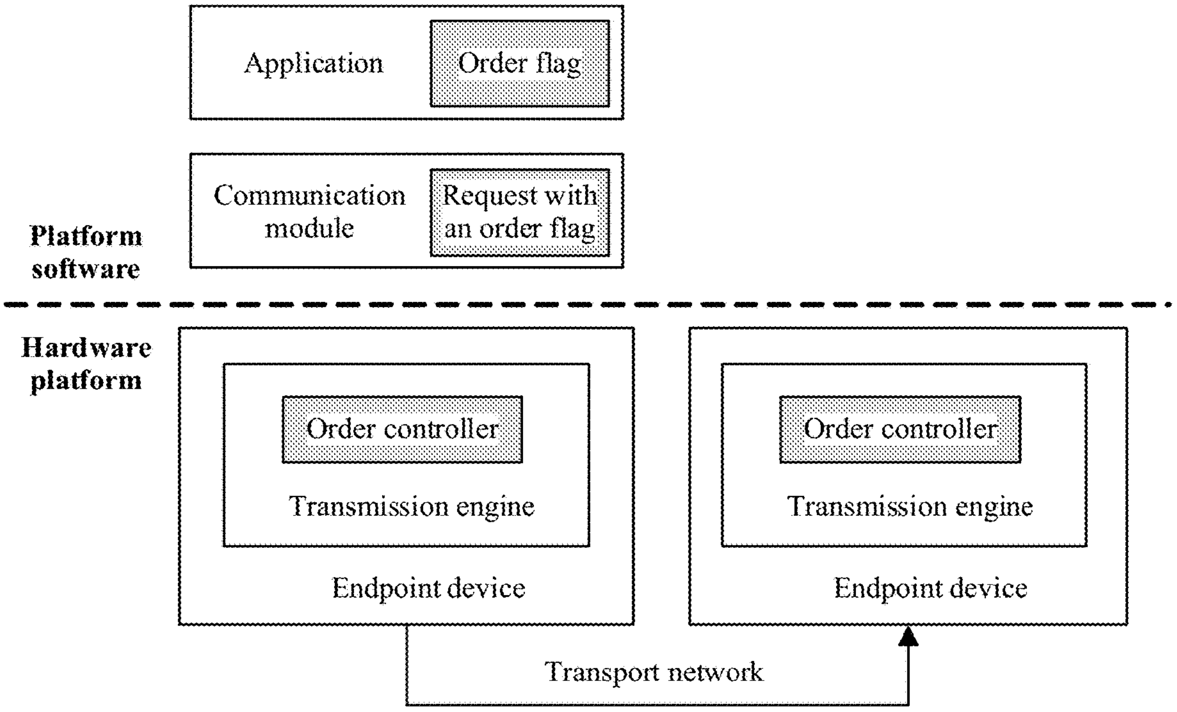
FIG. 3 is a schematic diagram of an implementation form of a product according to an embodiment of this application.

Based on the foregoing system architecture, the following further describes a product implementation form of this application. For details, refer to FIG. 3. FIG. 3 is a schematic diagram of a product implementation form according to an embodiment of this application. One part is included in a communication module of platform software, and the other part is deployed on a transmission engine of an endpoint device. The communication module of the platform software may be a user-mode communication library or a kernel communication module. The endpoint device may be hardware having a communication capability. An architecture of the endpoint device is not limited. The scenario shown in FIG. 3 is used as an example. Program code in this application is stored in the communication module of the platform software and the transmission engine of the hardware platform. The transaction initiator drives, by using the communication module, the transmission engine of the endpoint device to transmit and execute a transaction. In the platform software, an application needs to mark an order flag for a transaction generated each time; then encapsulate, by using the communication module, a request with the order flag; and transmit the request to storage space that can be accessed by the endpoint device, or directly transmit the request to internal storage space of the endpoint device. Inside the transmission engine, the endpoint device may identify the order flag by using a dedicated order controller, perform different processing based on different order flags to obtain order auxiliary information, and transmit the order flag and the order auxiliary information to the endpoint device at a destination end in a specific manner through a transmission network; and the endpoint device at the destination end parses and checks a dependency relationship based on the order flag and the order auxiliary information.

Figure 4:
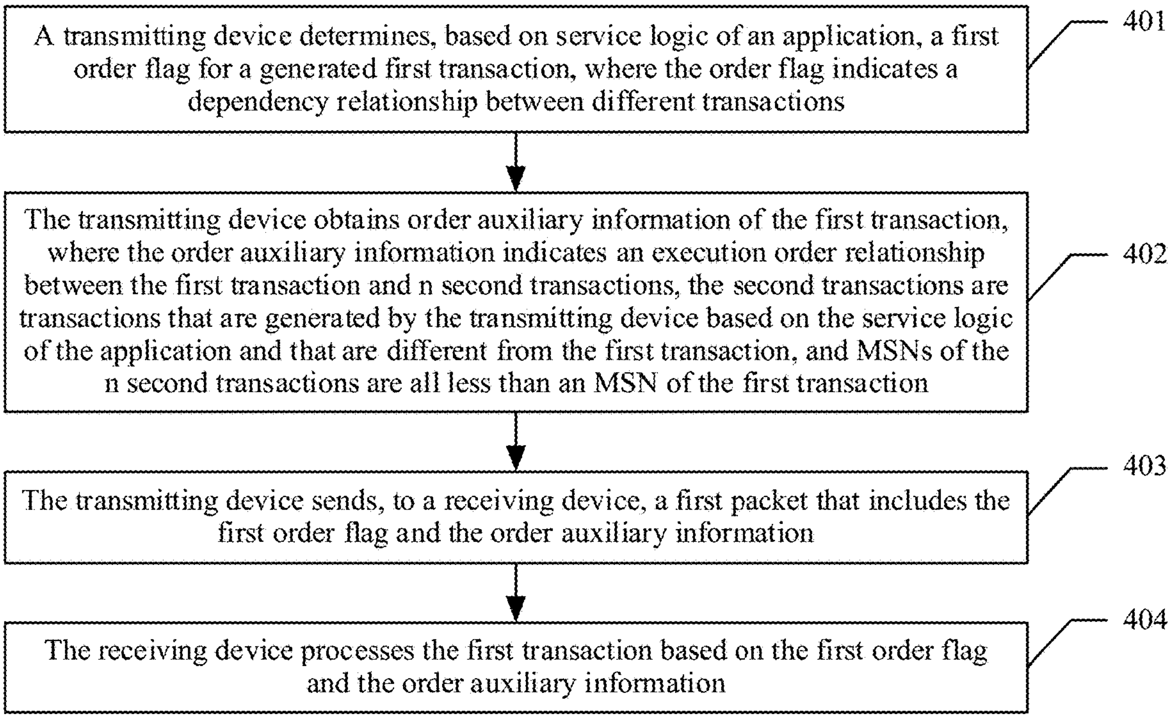
FIG. 4 is a schematic flowchart of a transaction processing method according to an embodiment of this application.

With reference to the foregoing description of the system architecture and the product implementation form, the following starts to describe a transaction processing method provided in an embodiment of this application. For details, refer to FIG. 4. FIG. 4 is a schematic flowchart of a transaction processing method according to an embodiment of this application. The method may specifically include the following steps.

401: A transmitting device determines, based on service logic of an application, a first order flag for a generated first transaction. The order flag indicates a dependency relationship between different transactions.

The application (that is, a transaction initiator) is deployed on the transmitting device. A transaction is generated in real time when the application is run. The transmitting device determines an order flag (that may be referred to as the first order flag) for each currently generated transaction (that may be referred to as the first transaction) based on the service logic of the application, and then delivers the constructed transaction (that is, the transaction marked with the order flag) to a specific place. The place may be a specific queue in a host memory or an intelligent network interface card. Then, a transmission engine of the transmitting device may obtain the transaction with the order flag from the place. The order flag uses a transaction order newly defined in the present invention. The order flag indicates a dependency relationship between different transactions. In this embodiment of this application, the order flag is a new transaction dependency relationship defined in this application. The new transaction dependency relationship does not depend on an operation type of a transaction.

Specifically, in some implementations of this application, the defined order flag may include but is not limited to any one of the following:

(1) Forward Dependent Order Flag (sync_pre)

The forward dependent order flag may be denoted as sync_pre, and indicate that a current transaction cannot precede a previous transaction when being executed by the receiving device. The so-called previous transaction means a transaction whose message sequence number (MSN) is less than an MSN of the current transaction. In other words, the MSN of the previous transaction is less than the MSN of the current transaction. The MSN may also be briefly referred to as a sequence number.

It should be noted herein that the MSN of the transaction is a sending sequence number marked by a transport layer of the transmitting device for each transaction. The transport layer sends the transaction in order based on a value of the MSN. A transaction with a smaller MSN is sent first, and a transaction with a larger MSN is sent later.

(2) Backward Blocking Order Flag (sync_post)

The backward blocking order flag may be denoted as sync_post, and indicate that the current transaction cannot be preceded by a subsequent transaction when being executed by the receiving device. The so-called subsequent transaction means a transaction whose MSN is greater than the MSN of the current transaction. In other words, the MSN of the subsequent transaction is greater than the MSN of the current transaction.

(3) Non-Dependent Order Flag (sync_none)

The non-dependent order flag may be denoted as sync_none, and indicate that the current transaction has neither forward dependency nor backward blocking. In other words, the current transaction can precede the previous transaction and can also be preceded by the subsequent transaction when being executed by the receiving device.

(4) Strongly Dependent Order Flag (sync_pre_post)

The strongly dependent order flag may be denoted as sync_pre_post, and indicate that the current transaction has both forward dependency and backward blocking. In other words, the current transaction cannot precede the previous transaction and cannot be preceded by the subsequent transaction when being executed by the receiving device.

For ease of description, in this embodiment of this application, the new transaction dependency relationship defined in this application is described by using an example in which there are the foregoing four order flags. To be specific, in this embodiment of this application, the transmitting device adds each of the four different order flags (a specific order flag that should be marked is determined based on the service logic of the application) for each generated transaction to indicate dependency between transactions.

It should be noted that, in some implementations of this application, two bits may be used to represent the foregoing four order flags. For example, an order flag including two bits: a sync_pre bit and a sync_post bit may indicate two types of flag information: sync_pre and sync_post, thereby constituting the foregoing four order flags. Details are as follows:

(1) When sync_pre=0, and sync_post=0, it indicates the non-dependent order flag.

Figure 5:
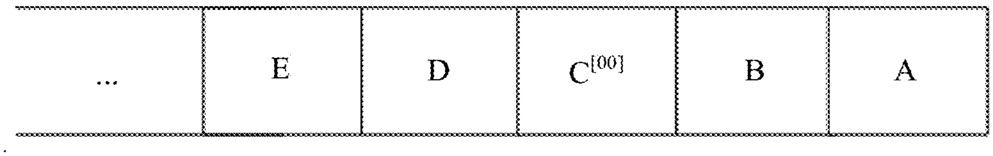
FIG. 5 is a schematic diagram of a transaction whose order flag is [00] according to an embodiment of this application.

As shown in FIG. 5, an order flag of a transaction C is [00], and indicates that the transaction C has no dependency relationship with a previous transaction and a subsequent transaction of the transaction C. In other words, the transaction C can be preceded by the subsequent transaction of the transaction C, and the transaction C can also precede the previous transaction of the transaction C.

(2) When sync_pre=0, and sync_post=1, it indicates the backward blocking order flag.

Figure 6:
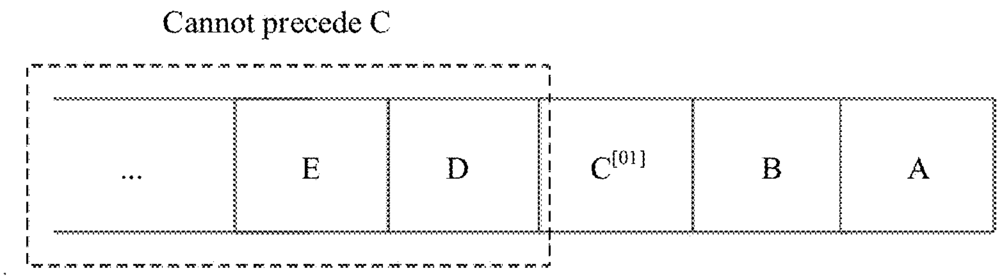
FIG. 6 is a schematic diagram of a transaction whose order flag is [01] according to an embodiment of this application.

As shown in FIG. 6, an order flag of a transaction C is [01], and indicates that the transaction C cannot be preceded by a subsequent transaction D, E, . . . , or the like of the transaction C. In other words, the transaction C needs to be executed before the subsequent transaction of the transaction C.

(3) When sync_pre=1, and sync_post=0, it indicates the forward dependent order flag.

Figure 7:
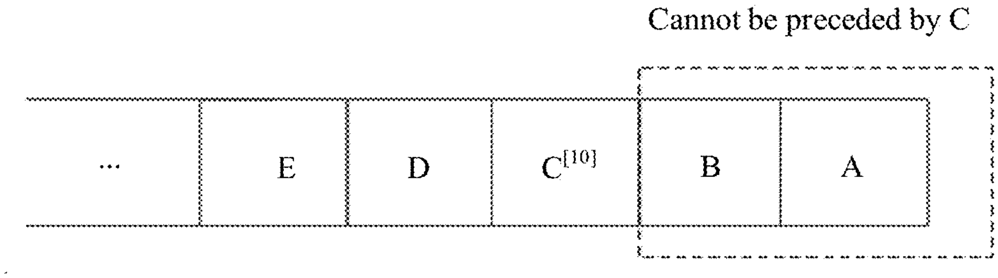
FIG. 7 is a schematic diagram of a transaction whose order flag is [10] according to an embodiment of this application.

As shown in FIG. 7, an order flag of a transaction C is [10], and indicates that the transaction C cannot precede a previous transaction A, a transaction B, or the like of the transaction C. In other words, the transaction C needs to be executed after the previous transaction of the transaction C.

(4) When sync_pre=1, and sync_post=1, it indicates the strongly dependent order flag.

Figure 8:
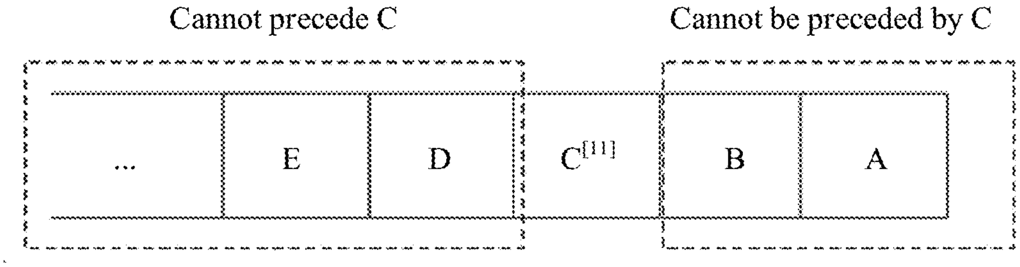
FIG. 8 is a schematic diagram of a transaction whose order flag is [11] according to an embodiment of this application.

As shown in FIG. 8, an order flag of a transaction C is [11], and indicates that the transaction C cannot be preceded by a subsequent transaction D, E, . . . , or the like of the transaction C, and the transaction C cannot precede a previous transaction A, B, or the like of the transaction C.

402: The transmitting device obtains the order auxiliary information of the first transaction. The order auxiliary information indicates an execution order relationship between the first transaction and n second transactions. The second transactions are transactions that are generated by the transmitting device based on the service logic of the application and that are different from the first transaction. MSNs of the n second transactions are all less than an MSN of the first transaction.

After determining the first order flag for the generated first transaction based on the service logic of the application, the transmitting device further obtains the order auxiliary information of the first transaction. The order auxiliary information indicates the execution order relationship between the first transaction and the n second transactions, where n≥1. The n second transactions are transactions that are generated by the transmitting device based on the service logic of the application and that are different from the first transaction. The MSNs of the n second transactions are all less than the MSN of the first transaction. In other words, the second transactions are previous transactions of the first transaction.

It should be noted that, in some implementations of this application, there are several possible implementations in which the transmitting device obtains the order auxiliary information of the first transaction. The following separately describes the implementations. The implementations include but are not limited to:

(1) The order auxiliary information is obtained based on the MSN of the first transaction and an MSN of a previous transaction with a post order flag (that is, the backward blocking order flag and the strongly dependent order flag).

Regardless of which one of the foregoing four order flags is the first order flag, the order auxiliary information of the first transaction may be obtained based on the MSN of the first transaction and the MSN of the previous transaction with the post order flag. It can be learned from the foregoing description of the four order flags that the post order flag means the backward blocking order flag sync_post and/or the strongly dependent order flag sync_pre_post.

Specifically, it is assumed that there are n previous transactions of the first transaction (that is, the second transactions), and n≥1. In this case, the transmitting device may first determine m candidate order flags from n second order flags corresponding to the n second transactions. The n second order flags are order flags that are determined by the transmitting device for the n generated second transactions based on the service logic of the application. One second order flag corresponds to one second transaction. The candidate order flag includes the backward blocking order flag sync_post or the strongly dependent order flag sync_pre_post. Herein, n≥m≥1. In other words, the m post candidate order flags are selected from the n second order flags corresponding to the n previous transactions of the first transaction. Then, the transmitting device obtains the order auxiliary information based on the MSN of the first transaction and MSNs of m second transactions. The m second transactions may also be referred to as m candidate transactions, and are in a one-to-one correspondence with the m candidate order flags. The m second transactions are m of the n second transactions.

It should be noted herein that the previous transactions of the first transaction may indicate n second transactions adjacent to the MSN of the first transaction, and a specific value of n may be preset (for example, n=6). For example, the n previous second transactions closest to the current first transaction may be determined in a sliding window manner. Alternatively, the n second transactions adjacent to the MSN of the first transaction may be periodically determined. For example, the previous transactions of the first transaction that are in a send queue in which the current first transaction is located may be obtained once every period duration T. Specifically, a manner of determining the n previous second transactions of the first transaction is not limited in this application.

Figure 9:
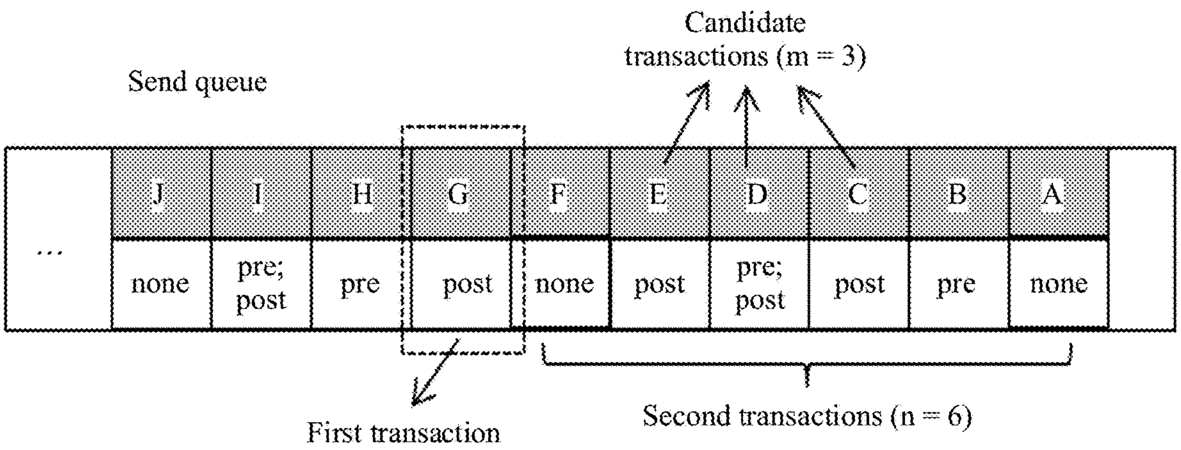
FIG. 9 is a schematic diagram of determining m candidate transactions from n second transactions according to an embodiment of this application.

For ease of understanding, the following uses an example for illustration. For details, refer to FIG. 9. FIG. 9 is a schematic diagram of determining m candidate transactions from n second transactions according to an embodiment of this application. It is assumed that a transaction G is a currently generated first transaction. It can be learned from an MSN of each transaction in a send queue that there are six previous transactions A to F of the transaction G, that is, n=6. In the six previous second transactions, transactions C, D, and E each have a post flag (the transaction D has both a post flag and a pre flag). Therefore, it may be determined that there are three candidate order flags respectively corresponding to the transactions C, D, and E, that is, m=3. It is assumed that the MSNs of the transactions A to G are 1 to 7. To be specific, an MSN of the first transaction (that is, the transaction G) is 7, and MSNs of the m second transactions are respectively 3, 4, and 5. Therefore, the order auxiliary information may be obtained based on MSN=7 (the first transaction), MSN=3, MSN=4, and MSN=5 (that is, the three second transactions).

It should be noted that, in some implementations of this application, a manner of obtaining the order auxiliary information based on the MSN of the first transaction and the MSN of the previous transaction with the post order flag may include but is not limited to the following:

a. The MSN of the first transaction and the MSN of the previous transaction with the post order flag are directly used as the order auxiliary information.

For ease of understanding, FIG. 9 is still used as an example. It is assumed that the MSN of the first transaction is 7 and the MSNs of the m second transactions are respectively 3, 4, and 5. In this case, MSN=7 (the first transaction), MSN=3, MSN=4, and MSN=5 (that is, the three second transactions) may be directly used as the order auxiliary information.

b. One MSN of a previous transaction is selected as a target MSN from the MSN of the previous transaction with the post flag (that is, the backward blocking order flag and the strongly dependent order flag), and the target MSN and the MSN of the first transaction jointly form the order auxiliary information.

When m≥2, the transmitting device determines one MSN as the target MSN (that may be referred to as a first MSN) from the MSNs of the m second transactions. For example, the transmitting device may determine an MSN with a largest value as the first MSN from the m MSNs, and use the MSN of the first transaction and the first MSN as the order auxiliary information.

For ease of understanding, FIG. 9 is still used as an example. It is assumed that the MSN of the first transaction is 7 and the MSNs of the m second transactions are respectively 3, 4, and 5. Herein, MSN=5 corresponds to the largest value. In this case, MSN=7 (the first transaction) and MSN=5 may be directly used as the order auxiliary information.

(2) If the first order flag has the post flag (that is, the forward dependent order flag or the strongly dependent order flag), the MSNs of the n previous transactions are selected as target MSNs. The target MSNs and the MSN of the first transaction jointly form the order auxiliary information.

If the first order flag has the post flag, that is, when the first order flag is the forward dependent order flag sync_pre or the strongly dependent order flag sync_pre_post, the transmitting device obtains an MSN of each of the n second transactions, and uses the MSN of the first transaction and the MSN of each second transaction as the order auxiliary information.

Figure 10:
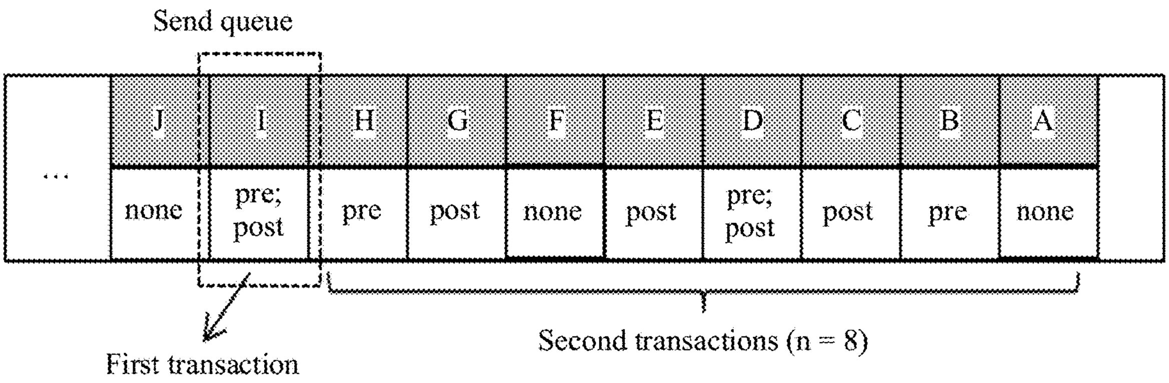
FIG. 10 is a schematic diagram of using all n second transactions as candidate transactions according to an embodiment of this application.

For ease of understanding, the following uses an example for illustration. For details, refer to FIG. 10. FIG. 10 is a schematic diagram of using n second transactions as candidate transactions according to an embodiment of this application. It is assumed that a transaction I is a currently generated first transaction, and an order flag of the transaction I has a post flag. It can be learned from an MSN of each transaction in a send queue that there are eight previous transactions A to H of the transaction I in total, that is, n=8. In this case, all eight MSNs corresponding to the eight previous second transactions may be used as target MSNs. It is assumed that MSNs of transactions A to J are respectively 1 to 10. To be specific, an MSN of the first transaction (that is, the transaction I) is 9, and MSNs of the n previous second transactions are respectively 1 to 8. Therefore, MSN=9 (the first transaction), MSN=1, MSN=2, MSN=3, MSN=4, MSN=5, MSN=6, MSN=7, and MSN=8 (that is, the eight second transactions) may be used as the order auxiliary information.

In conclusion, in this embodiment of this application, the order auxiliary information of the first transaction at least includes any one of the following: (1) the MSN of the first transaction and the MSNs of the m second transactions, where $n \geq m \geq 1$; (2) when $m \geq 2$, including the MSN of the first transaction and the first MSN, where the first MSN is an MSN determined from the MSNs of the m second transactions; or (3) when the first order flag is the forward dependent order flag or the strongly dependent order flag, including the MSN of the first transaction and the MSN of each of the n second transactions.

It should be noted herein that, in some implementations of this application, the transmitting device may further update order auxiliary information of a subsequently generated first transaction. For example, for the subsequently generated new first transaction, it is assumed that an original first MSN of the transaction E is 3, and the original first MSN of the transaction E is updated to 4 (that is, corresponding to the transaction D) because the inserted transaction D (assuming that the transaction D is a previous transaction of the transaction E) has the post flag.

403: The transmitting device sends, to the receiving device, a first packet that includes the first order flag and the order auxiliary information.

After separately obtaining the first order flag of the first transaction and the order auxiliary information of the first transaction, the transmitting device encapsulates the first transaction, the first order flag, and the order auxiliary information into a packet (that may be referred to as the first packet) at a transport layer, and sends the encapsulated first packet to the receiving device.

Specifically, in some implementations of this application, the transmitting device may encapsulate the first order flag and the order auxiliary information of the first transaction into a packet header of the first packet, and then send the encapsulated first packet to the receiving device.

Figure 11:
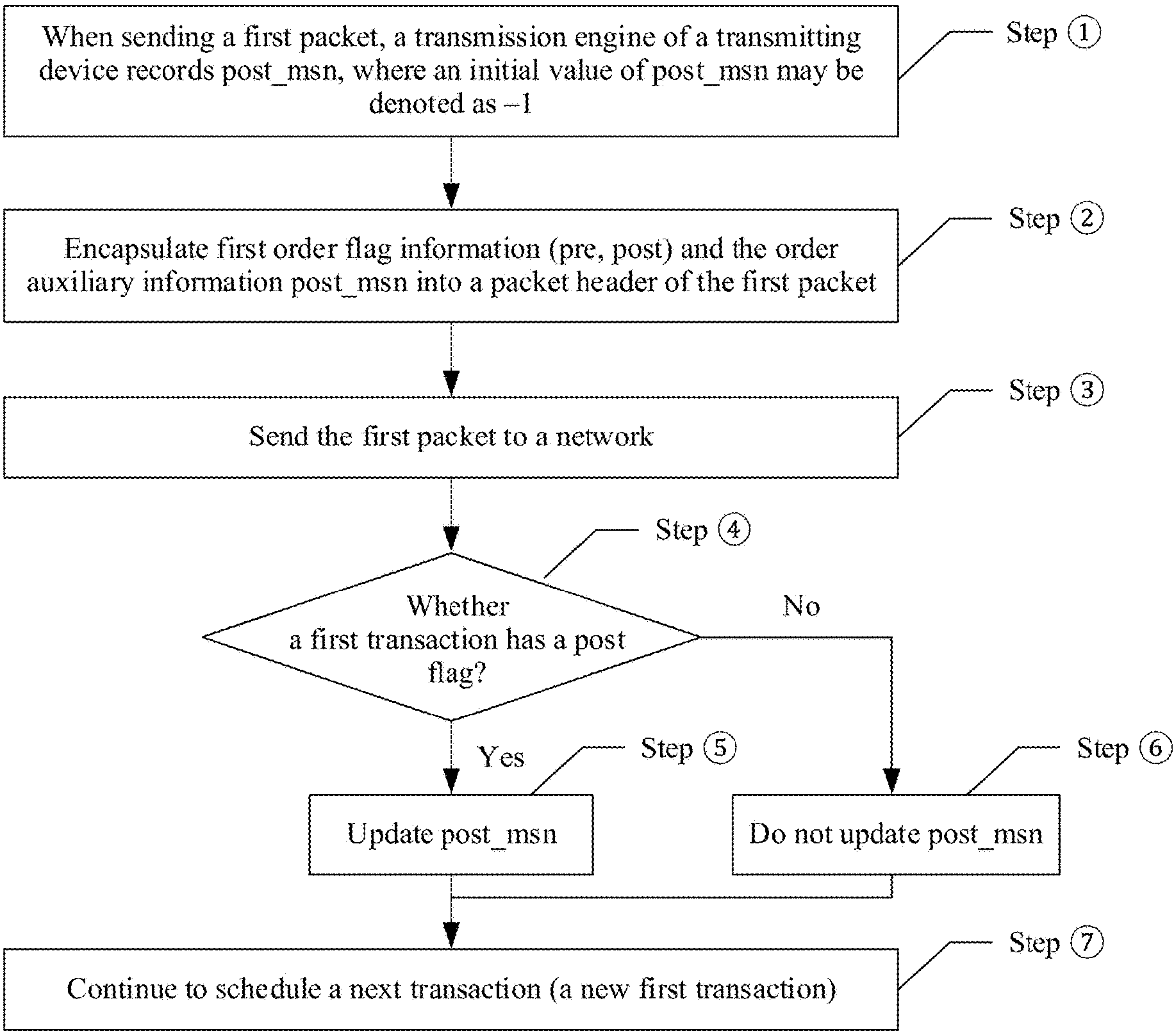
FIG. 11 is a schematic diagram in which a transmitting device implements encapsulation and maintenance of a first order flag and order auxiliary information according to an embodiment of this application.

For example, in the first packet, post_msn may indicate the order auxiliary information, and (pre, post) may indicate the first order flag. In this embodiment of this application, the transmission engine in the transmitting device may identify an order flag of a to-be-transmitted transaction, and maintain the order auxiliary information, to encapsulate key information of the packet. For details, refer to FIG. 11. FIG. 11 is a schematic diagram in which the transmitting device encapsulates and maintains a first order flag and order auxiliary information according to an embodiment of this application. A specific process may include the following steps:

Step ①: When sending the first packet, the transmission engine of the transmitting device records post_msn. An initial value of post_msn may be denoted as −1. When post_msn is −1, it indicates that all second transactions before the first transaction have been processed, and the first transaction does not depend on any previous second transaction.

Step ②: Encapsulate the first order flag information (pre, post) and the order auxiliary information post_msn into the packet header of the first packet.

Step ③: Send the first packet to a network.

Step ④: The transmission engine of the transmitting device determines whether the current first transaction has the post flag; and if the current first transaction has the post flag, performs step ⑤; or if the current first transaction does not have the post flag, performs step ⑥.

Step ⑤: Update post_msn.

Step ⑥: Do not update post_msn.

Step ⑦: Continue to schedule a next transaction (a new first transaction).

404: The receiving device processes the first transaction based on the first order flag and the order auxiliary information.

After receiving, from the transmitting device, the first packet that includes the first order flag and the order auxiliary information of the first transaction, the receiving device checks an execution condition based on the first order flag and the order auxiliary information of the first transaction, and processes the first transaction based on a check result. Specifically, before executing the first transaction, the receiving device determines whether execution of a previous transaction on which the first transaction depends is completed. When an execution condition is met (that is, execution of the previous transaction on which the first transaction depends is completed), the receiving device executes the first transaction. When an execution condition is not met (that is, execution of the previous transaction on which the first transaction depends is not completed), the receiving device caches the first transaction, and executes the first transaction after execution of the previous transaction on which the first transaction depends is completed; or the receive end device quits execution of the first transaction.

Specifically, in this embodiment of this application, for a different first order flag and different order auxiliary information of the first transaction, a manner in which the receiving device processes the first transaction is also different. The following separately describes the manners.

(1) The first order flag is the forward dependent order flag sync_pre or the strongly dependent order flag sync_pre_post (that is, has the pre flag).

When the first order flag is the forward dependent order flag sync_pre or the strongly dependent order flag sync_pre_post, that is, when the first order flag has the pre flag, the receiving device determines, based on the order auxiliary information, whether execution of each second transaction is completed, that is, determines whether execution of all the n previous second transactions is completed. If the receiving device determines that execution of each second transaction is completed, the receiving device executes the first transaction.

In some other implementations of this application, if the receiving device determines that execution of each second transaction is not completed, the receiving device executes the first transaction after execution of each second transaction is completed.

(2) The first order flag is the backward blocking order flag sync_post or the non-dependent order flag sync_none (that is, does not have the pre flag).

When the first order flag is the backward blocking order flag sync_post or the non-dependent order flag sync_none, that is, when the first order flag does not have the pre flag, a subsequent processing manner is further determined based on the order auxiliary information. The processing manner includes but is not limited to:

a. The order auxiliary information includes the MSN of the first transaction and the MSNs of the m second transactions.

When the order auxiliary information includes the MSN of the first transaction and the MSNs of the m second transactions, the receiving device determines, based on the order auxiliary information, whether execution of all the m second transactions is completed. If the receiving device determines that execution of all the m second transactions is completed, the receiving device executes the first transaction.

In some other implementations of this application, if the receiving device determines that execution of all the m second transactions is not completed, the receiving device executes the first transaction after execution of all the m second transactions is completed.

b. The order auxiliary information includes the MSN of the first transaction and the first MSN.

When the order auxiliary information includes the MSN of the first transaction and the first MSN (one MSN selected from the m MSNs), the receiving device determines, based on the order auxiliary information, whether execution of the target second transaction corresponding to the first MSN (for example, the MSN with the largest value in the m MSNs) is completed. If the receiving device determines that execution of the target second transaction is completed, the receiving device executes the first transaction.

In some other implementations of this application, if the receiving device determines that execution of the target second transaction is not completed, the receiving device executes the first transaction after execution of the target second transaction is completed.

Figure 12:
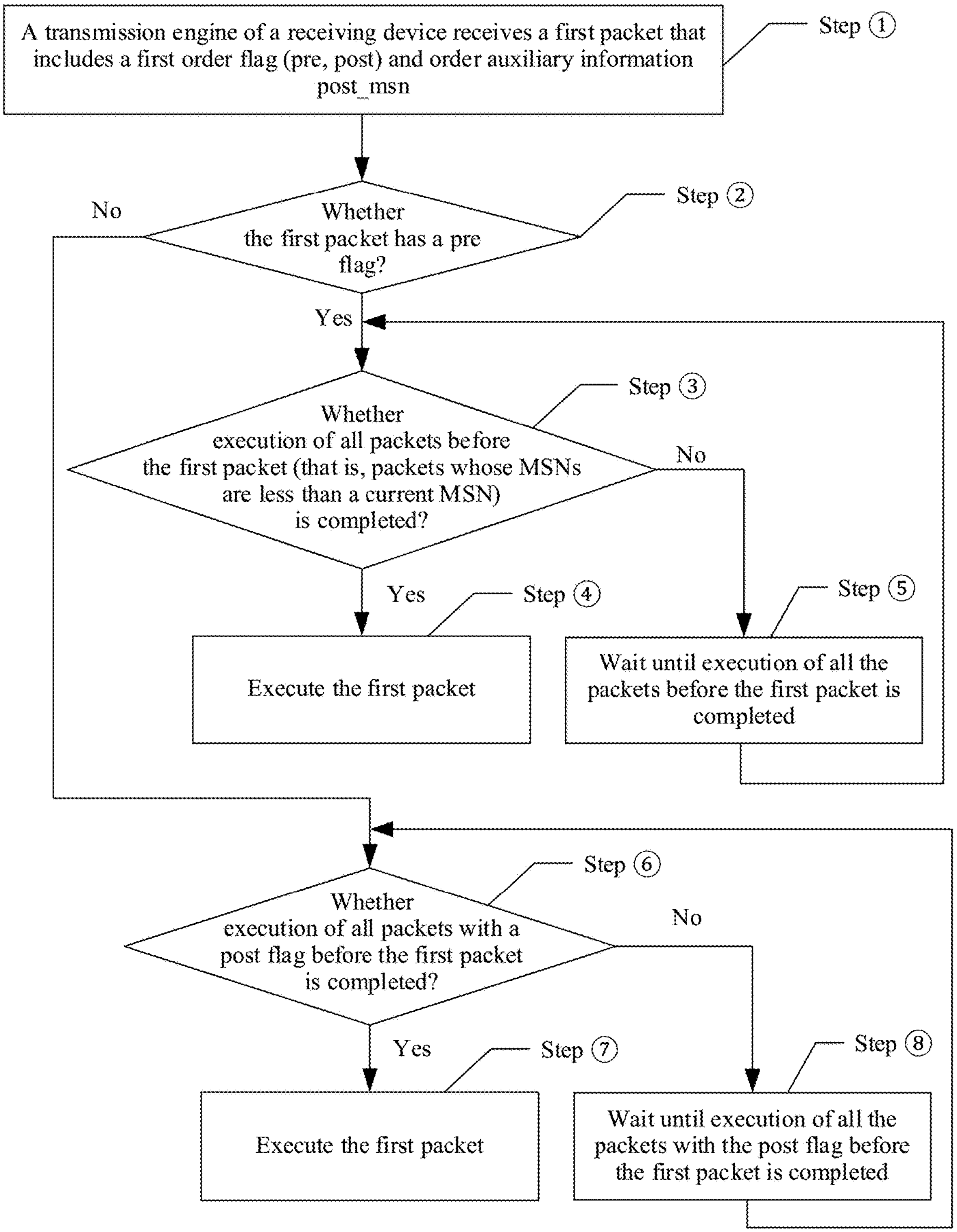
FIG. 12 is a schematic diagram in which a receiving device processes a first transaction based on a first order flag and order auxiliary information according to an embodiment of this application.

For example, for details of the foregoing processing process, refer to FIG. 12. FIG. 12 is a schematic diagram in which a receiving device processes a first transaction based on a first order flag and order auxiliary information according to an embodiment of this application. The processing process may specifically include the following steps:

Step ①: A transmission engine of the receiving device receives the first packet that carries the first order flag (pre, post) and the order auxiliary information post_msn.

Step ②: The receiving device determines whether the current first packet carries the pre flag; and if the current first packet carries the pre flag, performs step ③; or if the current first packet does not carry the pre flag, performs step ⑥.

Step ③: The receiving device determines whether execution of all packets (that is, packets whose MSNs are less than a current MSN) before the current first packet is completed; and if execution of all the packets before the current first packet is completed, performs step ④; or if execution of all the packets before the current first packet is not completed, performs step ⑤.

Step ④: The receiving device executes the current first packet.

Step ⑤: The receiving device waits until execution of all the packets before the current first packet is completed.

Step ⑥: The receiving device determines whether execution of all packets with the post flag before the current first packet is completed; and if execution of all the packets with the post flag before the current first packet is completed, performs step ⑦; or if execution of all the packets with the post flag before the current first packet is not completed, performs step ⑧.

Step ⑦: The receiving device executes the current first packet.

Step ⑧: The receiving device waits until execution of all the packets with the post flag before the current first packet is completed.

It should be noted herein that, in some implementations of this application, during implementation of this embodiment of this application, some matters need to be further noted to make the solution applicable to more scenarios. The matters include but are not limited to:

(1) The transmission engine of the receiving device needs to maintain historical execution information, to help query whether execution of all the packets with the post order flag before the current first packet is completed.

(2) On a network in which a packet loss may occur, the transmission engine of the transmitting device may need to retransmit a packet. In this case, an order flag and post_msn information of the packet should have same values used when the packet is transmitted for the first time. In other words, the transmission engine of the transmitting device needs to record the original order flag and the original post_msn information. Particularly, an optimization method is that when it is found during retransmission that all packets before the packet are completed, post_msn carried in the retransmitted packet may be special information, to indicate that all the packets with the post flag before the packet are completed.

(3) A manner of ensuring an order of a transaction whose operation type is read is as follows: In an implementation, an acknowledgment label is added to the transaction whose operation type is read, so that the receiving device can accurately store a read completed state. In another implementation, a manner similar to a manner of processing an atomic operation result according to RDMA is used, and read data of a read operation is stored on the receiving device side.

(4) When the post_msn information occupies a relatively large quantity of bits, an offset may be used to replace the post_msn information. A reference of the offset is an MSN corresponding to the packet.

It should be noted that, in some implementations of this application, after the transmitting device sends, to the receiving device, the first packet that includes the first order flag and the order auxiliary information, the transmitting device may continue to use, as a new first transaction, a transaction newly generated based on the service logic of the application, and repeatedly perform step 401 to step 403. In other words, each new transaction generated on the transmitting device side may be used as a new first transaction on which the foregoing processing is to be performed.

Figure 13:
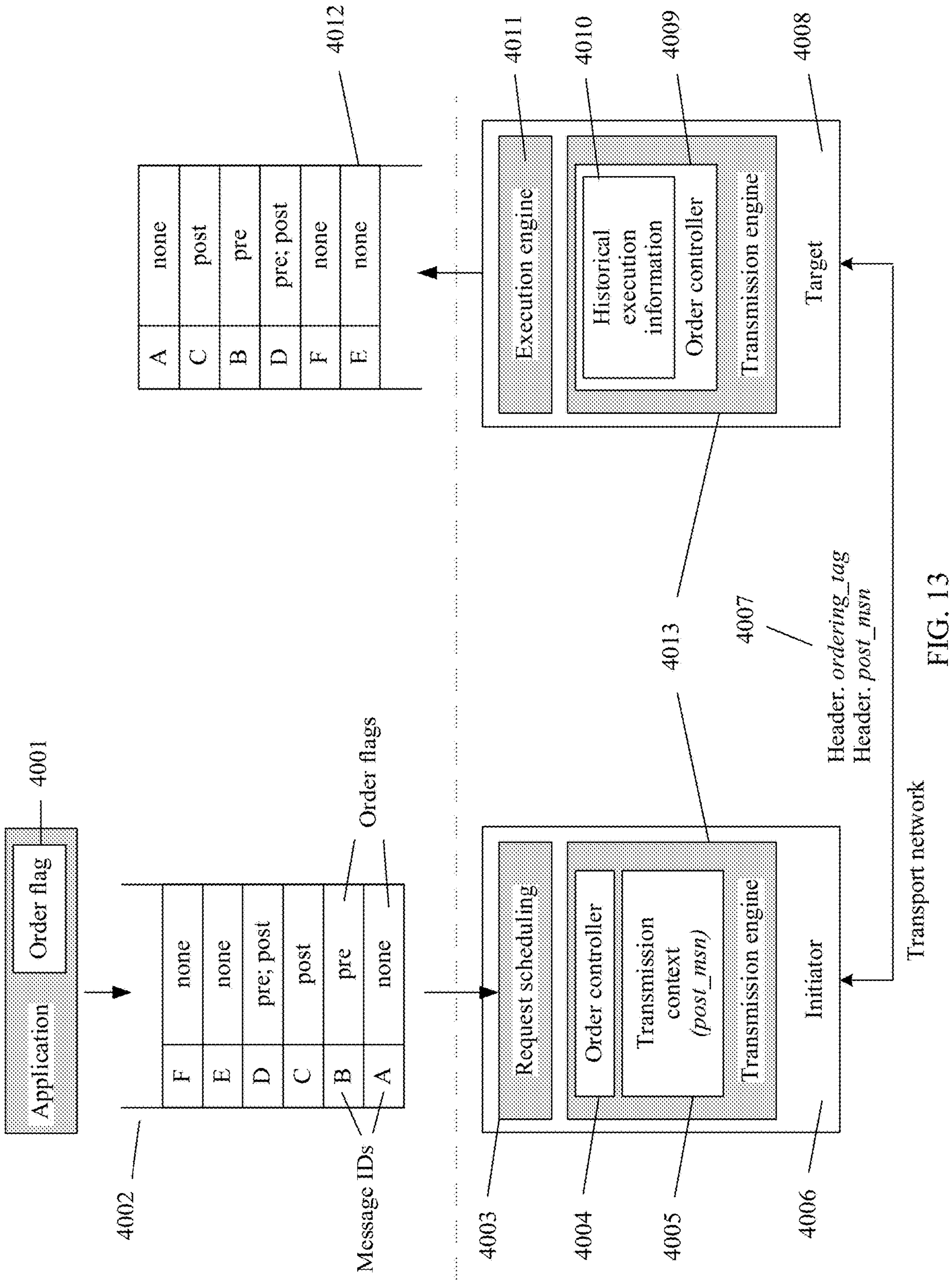
FIG. 13 is a schematic diagram of an instance according to an embodiment of this application.

For ease of understanding of step 401 to step 403, the following describes the foregoing entire process by using a specific instance. For details, refer to FIG. 13. FIG. 13 is a schematic diagram of an instance according to an embodiment of this application. A specific implementation process is as follows:

A request (that is, a transaction, where one transaction corresponds to one request) delivered by an application needs to carry an order flag 4001. The request is temporarily stored in a request queue 4002. Request scheduling 4003 in a transmitting device 4006 obtains a to-be-processed request from the request queue 4002, and then delivers the to-be-processed request to a transmission engine 4013 for protocol processing. The transmission engine 4013 needs to encapsulate the request into a packet, and maintain transmitted context information 4005 (that is, order auxiliary information). In this embodiment, the transmission engine 4013 additionally maintains the context information referred to as post_msn. The transmission engine 4013 encapsulates the packet by encapsulating two order-related fields 4007 into a packet header. For example, as shown in FIG. 13, Header.ordering_tag is a field indicating an order flag, and Header.post_msn is a field indicating order auxiliary information. Then, the transmission engine 4013 transmits the encapsulated packet to a receiving device 4008 through a network. When the receiving device 4008 processes reliable transmission, the receiving device 4008 further determines, by using an order controller 4009, whether a specific request can be currently executed, that is, whether current execution damages an order rule of an application. When the order controller 4009 determines whether the specific request can be currently executed, in addition to the order-related fields 4007 in the packet, historical execution information 4010 further needs to be used. When a specific request can be executed by the receiving device 4008, an execution engine 4011 executes the request. Finally, an order in which the execution engine 4012 executes several received requests is observed on the receiving device side, and the order may be an order shown in an execution queue 4012. Although the order may be different from an order shown in the request queue 4002, the order does not violate an order rule specified by the application. It should be noted that, in this embodiment of this application, some processing logic of the transmission engine 4013 is designed, to instruct generation of the order-related fields 4007 and instruct the order controller 4009 to perform an order check.

It should be further noted that, in an actual application process, a large quantity of applications are accustomed to an RDMA standard interface. An order dependency between transactions is defined based on various RDMA operation types shown in FIG. 1. If the application is not modified, a new transaction order solution cannot be used. Therefore, for such an application that still needs to use the RDMA standard interface, in this embodiment of this application, an original RDMA transaction order based on a transaction type may be further converted, according to a logical rule, in an order marking manner defined in this application. In other words, the application that uses the existing RDMA standard interface may perform transaction transmission by using the technical solutions provided in this embodiment of this application without modifying the application. Specifically, in some implementations of this application, the new order marking manner defined in this embodiment of this application may be further used to describe an existing commonly used RDMA transaction order. In this case, a manner in which the transmitting device determines the first order flag for the generated first transaction based on the service logic of the application in step 401 may be as follows: The transmitting device obtains the first transaction through a remote direct memory access RDMA interface, and determines, according to a specification of an RDMA protocol, a first transaction type of the first transaction. Then, the transmitting device determines, based on an execution order of a transaction type specified in the RDMA protocol, the first order flag corresponding to the first transaction type.

Figure 14:
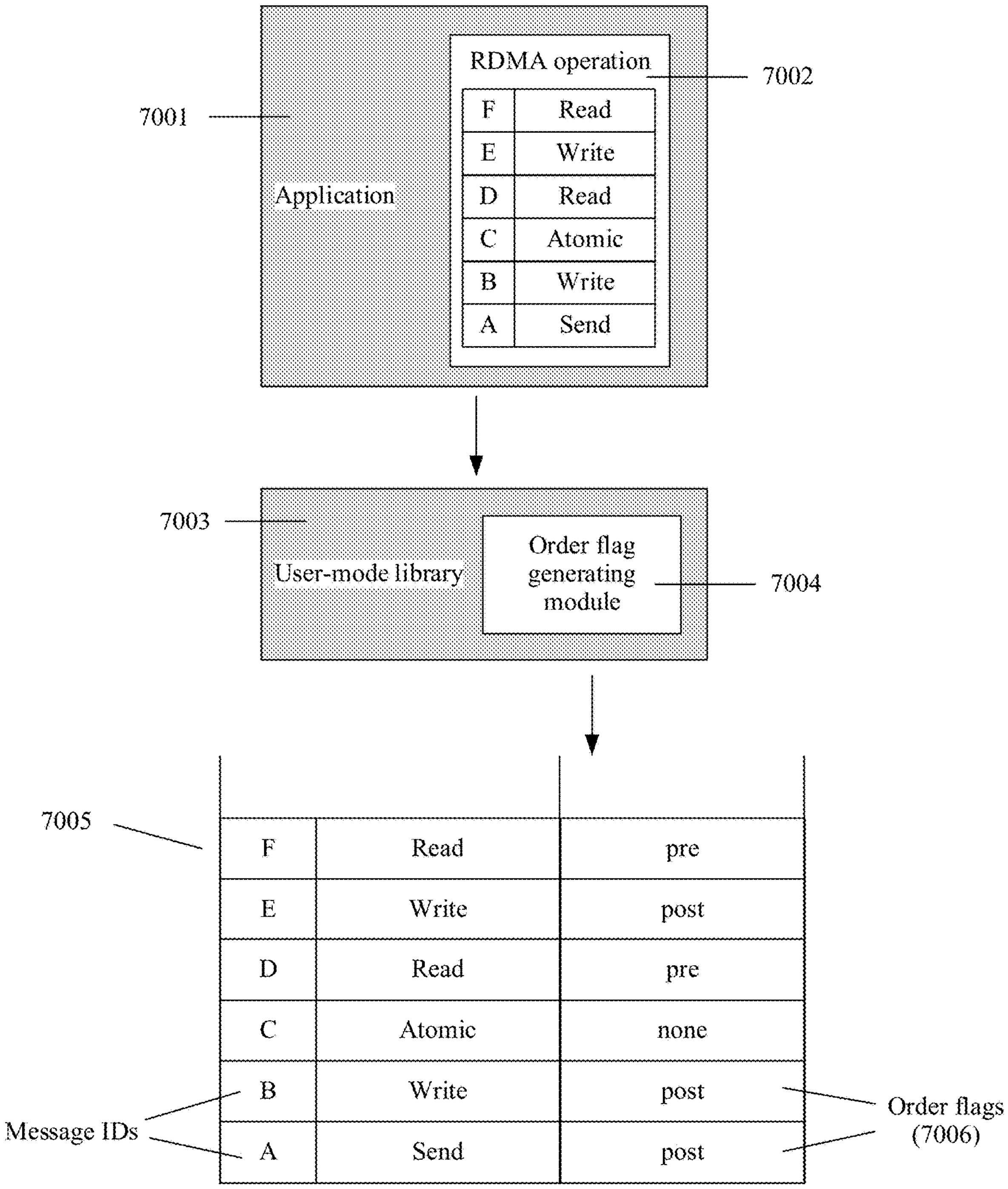
FIG. 14 is a schematic diagram of converting an RDMA transaction order to an order flag in this application according to an embodiment of this application.

For details, refer to FIG. 14. FIG. 14 is a schematic diagram of converting an RDMA transaction order into an order flag in this application according to an embodiment of this application. A request delivered by an application based on an RDMA standard interface marks only a transaction order specified by the RDMA standard interface, as shown in FIG. 1. A user-mode library 7003 may analyze various types of transactions delivered by an application 7001 based on the RDMA standard interface, and generate, for these transactions by using an order flag generating module 7004, transaction order flags defined in this embodiment of this application. Request content received by a lower-layer interface is shown in a request queue 7005, and includes order flag information shown in 7006.

For the transaction order specified by the RDMA standard interface, the order flag generating module 7004 may generate an order flag according to the following rules:

(1) Transactions whose operation types are write or send are all marked with post.

(2) Transactions whose operation types are read are all marked with pre.

(3) Transactions whose operation types are atomic are all marked with none.

(4) For other types of transactions (some additional management transactions included in specifications of the RDMA protocol), for example, a. bind window transactions are all marked with post; b. local invalidate transactions are all marked with post; and b. fast register physical MR transactions are all marked with post.

According to the foregoing rules, after adding an order flag for each type of RDMA transaction, the order flag generating module 7004 can further keep consistent with a transaction order specified by the original RDMA protocol. To be specific, an application that works by using the original RDMA order can use the technical solutions provided in this embodiment of this application to complete execution of a transaction based on the transaction order newly defined in this application without modifying code or requiring the application to display a specified transaction order flag.

It should be noted that, in some implementations of this application, the user-mode library 7003 may modify a standard Verbs interface by using the following method: adding two order flag bits: IBV_SEND_SYNC_PRE and IBV_SEND_SYNC_POST to a send_flags field in an ibv_send_wr standard data structure. As described above, the two flag bits may describe four order flags: sync_pre, sync_post, sync_none and sync_pre_post.

In the foregoing implementation of this application, an order rule for a transaction inherent interface is converted into a newly defined transaction order expression manner in this embodiment of this application. It is proved that the newly defined transaction order in this embodiment of this application has a very flexible expression capability. In addition, it is proved that the existing transaction order rule can use the newly defined transaction order in this embodiment of this application without modifying the application, thereby improving transaction execution efficiency and reducing network traffic.

The order flag defined in this embodiment of this application may be applied to any scenario. The following uses several typical application scenarios as examples for illustration.

(1) Device Access Order

Figure 15:
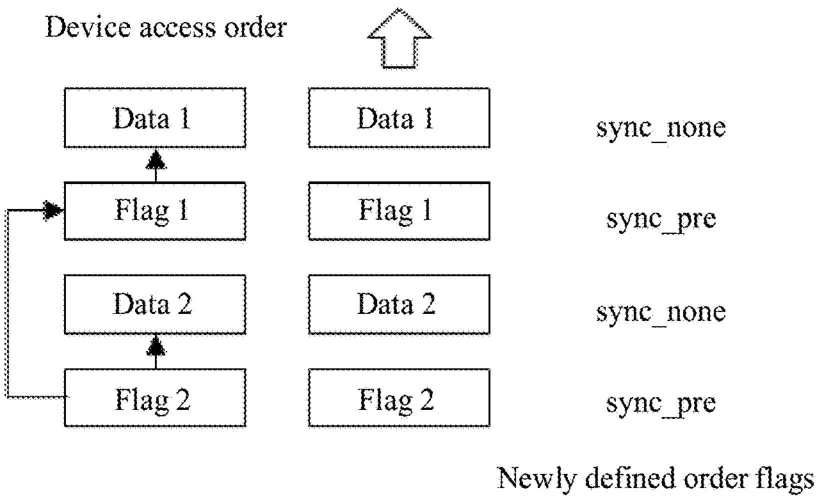
FIG. 15 is a schematic diagram of an application scenario according to an embodiment of this application.

As shown in FIG. 15, in this application scenario, a transaction of writing a flag cannot precede a corresponding transaction of writing data, and a subsequently initiated transaction of writing a flag cannot precede a previously initiated transaction of writing a flag. According to this logical rule, an order flag of each specific transaction may be newly defined as a right side shown in FIG. 15.

(2) Data Operation Order in a Storage Scenario.

Figure 16:
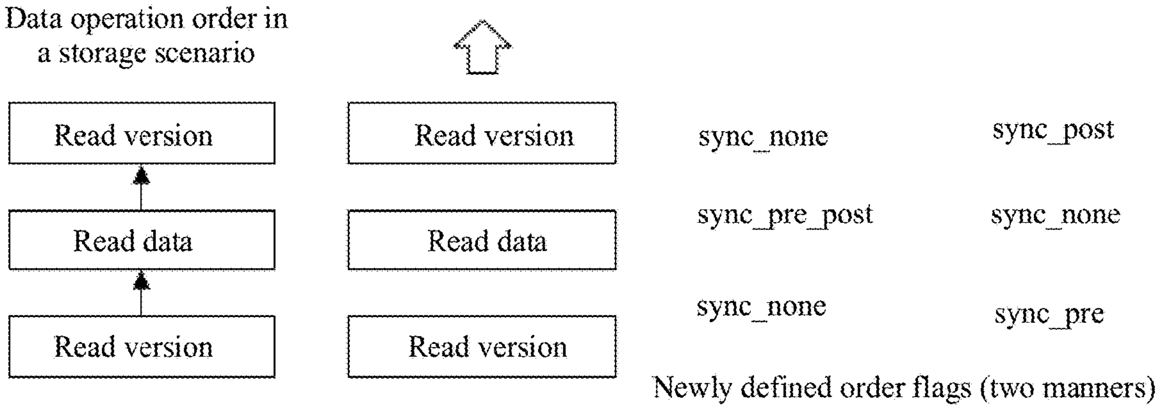
FIG. 16 is a schematic diagram of another application scenario according to an embodiment of this application.

As shown in FIG. 16, it can be considered that to-be-operated data has a specific determined version only when results of two times of obtaining version (version) information of the to-be-operated data are consistent. According to this logical rule, an order flag of each specific transaction may be newly defined as either one of two types of expressions on a right side shown in FIG. 16.

(3) Data Stream Sending and Receiving Order

Figure 17:
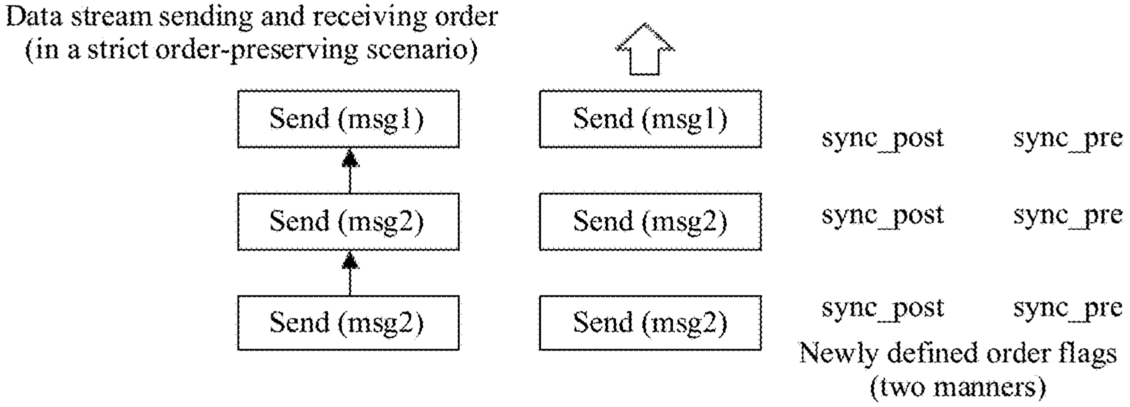
FIG. 17 is a schematic diagram of another application scenario according to an embodiment of this application.

As shown in FIG. 17, a data stream sending and receiving order is an order in a strict order-preserving scenario, and all messages are required to be sent in order on a transmit side and to be executed in order on a receive side. According to this logical rule, an order flag of each specific transaction may be newly defined as either one of two types of expressions on a right side shown in FIG. 17.

(4) Remote Memory Access Order

Figure 18:
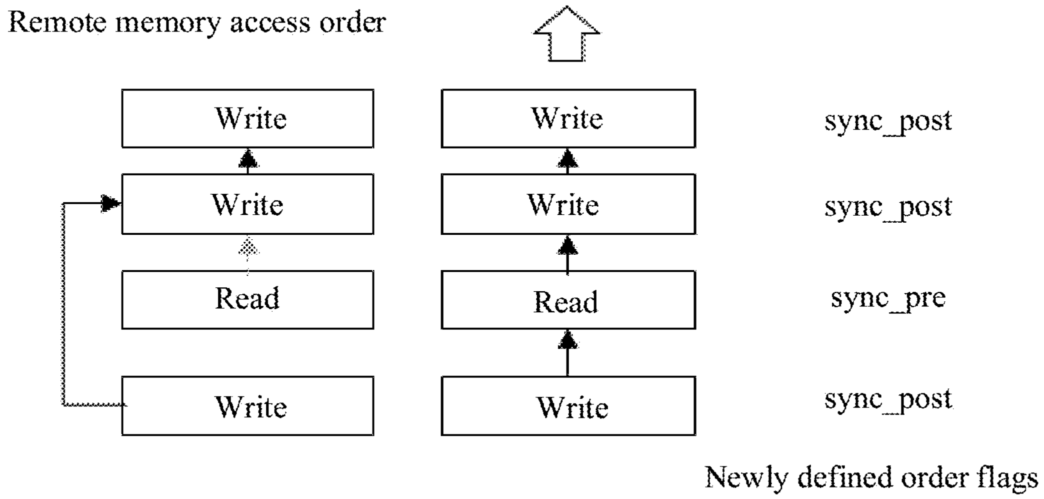
FIG. 18 is a schematic diagram of another application scenario according to an embodiment of this application.

As shown in FIG. 18, Read cannot precede Write or Read, Write cannot precede Write, and Write can precede Read. It is assumed that information about previous Write may be seen when an order flag is added to specific Write. In this case, according to this logical rule, an order flag of each specific transaction may be newly defined as a right side shown in FIG. 18.

Figure 19:
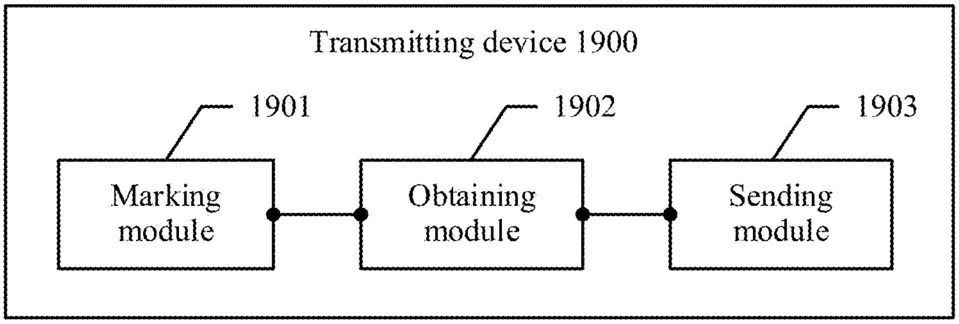
FIG. 19 is a schematic diagram of a structure of a transmitting device according to an embodiment of this application.

Based on the embodiments corresponding to FIG. 4 and FIG. 11 to FIG. 14, to better implement the foregoing solutions in embodiments of this application, the following further provides related devices configured to implement the foregoing solutions. For details, refer to FIG. 19. FIG. 19 is a schematic diagram of a structure of a transmitting device according to an embodiment of this application. The transmitting device 1900 may specifically include a marking module 1901, an obtaining module 1902, and a sending module 1903. The marking module 1901 is configured to determine, based on service logic of an application, a first order flag for a generated first transaction. The order flag indicates a dependency relationship between different transactions. The obtaining module 1902 is configured to obtain order auxiliary information of the first transaction. The order auxiliary information indicates an execution order relationship between the first transaction and n second transactions. The n second transactions are transactions that are generated by the transmitting device based on the service logic of the application and that are different from the first transaction. Sequence numbers MSNs of the n second transactions are all less than an MSN of the first transaction. Herein, $n \geq 1$. The sending module 1903 is configured to send, to a receiving device, a first packet that includes the first order flag and the order auxiliary information, so that the receiving device processes the first transaction based on the first order flag and the order auxiliary information. The first packet corresponds to the first transaction.

In a possible design, the order flag at least includes one of the following: a forward dependent order flag, indicating that a current transaction cannot precede a previous transaction when being executed by the receiving device, where an MSN of the previous transaction is less than an MSN of the current transaction; a backward blocking order flag, indicating that the current transaction cannot be preceded by a subsequent transaction when being executed by the receiving device, where an MSN of the subsequent transaction is greater than the MSN of the current transaction; a non-dependent order flag, indicating that the current transaction has neither forward dependency nor backward blocking; and a strongly dependent order flag, indicating that the current transaction has both forward dependency and backward blocking.

In a possible design, the obtaining module 1902 is specifically configured to: determine m candidate order flags from n second order flags, where the n second order flags are order flags that are determined by the transmitting device for the n generated second transactions based on the service logic of the application, the candidate order flag includes the backward blocking order flag or the strongly dependent order flag, and $n \geq m \geq 1$; and obtain the order auxiliary information based on the MSN of the first transaction and MSNs of m second transactions, where the m second transactions are in a one-to-one correspondence with the m candidate order flags, and the m second transactions are m of the n second transactions.

In a possible design, the obtaining module 1902 is further specifically configured to: when $m \geq 2$, determine a first MSN from the MSNs of the m second transactions; and then use the MSN of the first transaction and the first MSN as the order auxiliary information.

In a possible design, the obtaining module 1902 is specifically configured to: when the first order flag is the forward dependent order flag or the strongly dependent order flag, obtain an MSN of each of the n second transactions; and use the MSN of the first transaction and an MSN of each second transaction as the order auxiliary information.

In a possible design, the sending module 1903 is specifically configured to: encapsulate the first order flag and the order auxiliary information into a packet header of a first packet; and send the first packet to the receiving device.

In a possible design, the marking module 1901 is specifically configured to: obtain the first transaction through a remote direct memory access RDMA interface, and determine, according to a specification of an RDMA protocol, a first transaction type of the first transaction; and determine, based on an execution order of a transaction type specified in the RDMA protocol, the first order flag corresponding to the first transaction type.

It should be noted that content such as information exchange and an execution process between modules/units in the transmitting device 1900 in the embodiment corresponding to FIG. 19 is based on a same concept as the method embodiments corresponding to FIG. 4 and FIG. 11 to FIG. 14 in this application. For specific content, refer to the description and the operation process performed by the transmitting device in the foregoing method embodiments of this application. Details are not described herein again.

Figure 20:
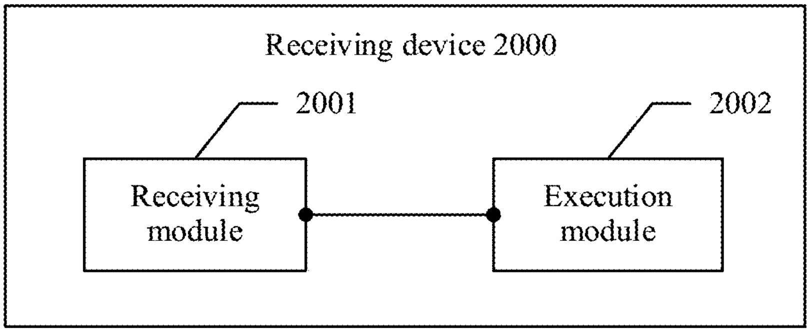
FIG. 20 is a schematic diagram of a structure of a receiving device according to an embodiment of this application.

The following describes another device provided in an embodiment of this application. FIG. 20 is a schematic diagram of a structure of a receiving device according to an embodiment of this application. The receiving device 2000 may specifically include a receiving module 2001 and an execution module 2002. The receiving module 2001 is configured to receive a first packet sent by a transmitting device. The first packet corresponds to a first transaction. The first packet includes a first order flag and order auxiliary information of the first transaction. The first transaction is a transaction generated by the transmitting device based on service logic of an application. The first order flag is an order flag determined by the transmitting device for the first transaction. The order flag indicates a dependency relationship between different transactions. The order auxiliary information indicates an execution order relationship between the first transaction and n second transactions. The n second transactions are transactions that are generated by the transmitting device based on the service logic of the application and that are different from the first transaction. Sequence numbers MSNs of the n second transactions are all less than an MSN of the first transaction. The execution module 2002 is configured to process the first transaction based on the first order flag and the order auxiliary information.

In a possible design, the order flag at least includes one of the following: a forward dependent order flag, indicating that a current transaction cannot precede a previous transaction when being executed by the receiving device, where an MSN of the previous transaction is less than an MSN of the current transaction; a backward blocking order flag, indicating that the current transaction cannot be preceded by a subsequent transaction when being executed by the receiving device, where an MSN of the subsequent transaction is greater than the MSN of the current transaction; a non-dependent order flag, indicating that the current transaction has neither forward dependency nor backward blocking; and a strongly dependent order flag, indicating that the current transaction has both forward dependency and backward blocking.

In a possible design, the order auxiliary information at least includes any one of the following:

the MSN of the first transaction and MSNs of m second transactions, where the MSNs of the m second transactions are in a one-to-one correspondence with m candidate order flags, the m candidate order flags are determined by the transmitting device from the n second order flags, the n second order flags are order flags that are determined by the transmitting device for the n generated second transactions based on the service logic of the application, the candidate order flag includes the backward blocking order flag or the strongly dependent order flag, and $n \geq m \geq 1$; or when $m \geq 2$, including the MSN of the first transaction and a first MSN, where the first MSN is an MSN determined from MSNs of m second transactions; or when the first order flag is the forward dependent order flag or the strongly dependent order flag, including the MSN of the first transaction and an MSN of each of the n second transactions.

In a possible design, the execution module 2002 is specifically configured to: when the first order flag is the forward dependent order flag or the strongly dependent order flag, determine, based on the order auxiliary information, whether execution of each second transaction is completed; and if the receiving device determines that execution of each second transaction is completed, execute the first transaction.

In a possible design, the execution module 2002 is further specifically configured to: if the receiving device determines that execution of each second transaction is not completed, execute the first transaction after execution of each second transaction is completed.

In a possible design, the execution module 2002 is specifically configured to: when the order auxiliary information includes the MSN of the first transaction and the MSNs of the m second transactions, and the first order flag is the backward blocking order flag or the non-dependent order flag, determine, based on the order auxiliary information, whether execution of all the m second transactions is completed; and if the receiving device determines that execution of all the m second transactions is completed, execute the first transaction.

In a possible design, the execution module 2002 is further specifically configured to: if the receiving device determines that execution of the m second transactions is not completed, execute the first transaction after execution of the m second transactions is completed.

In a possible design, the execution module 2002 is specifically configured to: when the order auxiliary information includes the MSN of the first transaction and the first MSN, and the first order flag is the backward blocking order flag or the non-dependent order flag, determine, based on the order auxiliary information, whether execution of a target second transaction corresponding to the first MSN is completed; and if the receiving device determines that execution of the target second transaction is completed, execute the first transaction.

In a possible design, the execution module 2002 is further specifically configured to: if the receiving device determines that execution of the target second transaction is not completed, execute the first transaction after execution of the target second transaction is completed.

It should be noted that content such as information exchange and an execution process between modules/units in the receiving device 2000 in the embodiment corresponding to FIG. 20 is based on a same concept as the method embodiments corresponding to FIG. 4 and FIG. 11 to FIG. 14 in this application. For specific content, refer to the description and the operation process performed by the receiving device in the foregoing method embodiments of this application. Details are not described herein again.

Figure 21:
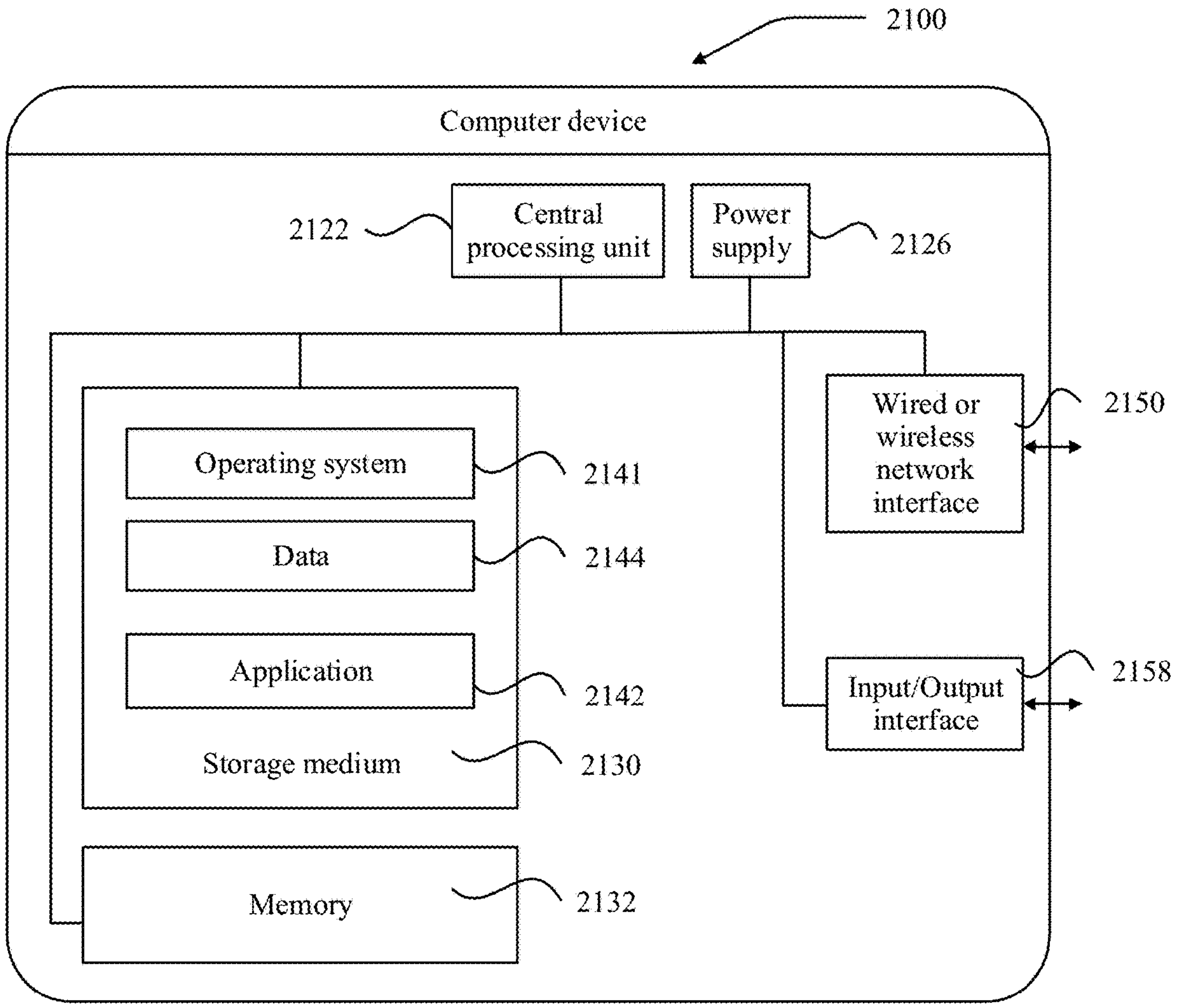
FIG. 21 is a schematic diagram of a structure of a computer device according to an embodiment of this application.

The following describes a computer device according to an embodiment of this application. FIG. 21 is a schematic diagram of a structure of a computer device according to an embodiment of this application. The computer device 2100 may be the transmitting device in this application, or may be the receiving device in this application. When the computer device 2100 is the transmitting device, the modules described in the embodiment corresponding to FIG. 19 may be deployed on the computer device 2100, to implement the functions of the transmitting device 1900 in the embodiment corresponding to FIG. 19. When the computer device 2100 is the receiving device, the modules described in the embodiment corresponding to FIG. 20 may be deployed on the computer device 2100, to implement the functions of the receiving device 2000 in the embodiment corresponding to FIG. 20. Specifically, the computer device 2100 is implemented by one or more servers. The computer device 2100 may vary greatly due to different configurations or performance, and may include one or more central processing units (CPU) 2122 (for example, one or more processors) and a memory 2132, and one or more storage media 2130 (for example, one or more mass storage devices) that store an application program 2142 or data 2144. The memory 2132 and the storage medium 2130 may be transitory storage or persistent storage. The program stored in the storage medium 2130 may include one or more modules (not shown in the figure). Each module may include a series of instruction operations for the computer device 2100. Further, the central processing unit 2122 may be configured to communicate with the storage medium 2130, and perform, on the computer device 2100, the series of instruction operations in the storage medium 2130.

The computer device 2100 may further include one or more power supplies 2126, one or more wired or wireless network interfaces 2150, one or more input/output interfaces 2158, and/or one or more operating systems 2141, for example, Windows Server™, Mac OS X™, Unix™, Linux™, or FreeBSD™.

In this embodiment of this application, when the computer device 2100 is the transmitting device, the computer device 2100, as the transmitting device, may perform the steps performed by the transmitting device in the embodiments corresponding to FIG. 4 and FIG. 11 to FIG. 14. For example, the central processing unit 2122 may be configured to: determine, based on service logic of an application, a first order flag for a generated first transaction, where the order flag indicates a dependency relationship between different transactions; after determining the first order flag for the generated first transaction based on the service logic of the application, further obtain order auxiliary information of the first transaction, where the order auxiliary information indicates an execution order relationship between the first transaction and n second transactions, n≥1, the n second transactions are transactions that are generated by the transmitting device based on the service logic of the application and that are different from the first transaction, and sequence numbers MSNs of the n second transactions are all less than an MSN of the first transaction, that is, the second transactions are previous transactions of the first transaction; and finally, send, to the receiving device, a first packet that includes the first order flag and the order auxiliary information, so that the receiving device processes the first transaction based on the first order flag and the order auxiliary information, where the first packet corresponds to the first transaction.

The central processing unit 2122 is configured to perform any step performed by the transmitting device in the embodiments corresponding to FIG. 4 and FIG. 11 to FIG. 14. For specific content, refer to the description in the method embodiments described above in this application. Details are not described herein again.

In some other embodiments of this application, when the computer device 2100 is the receiving device, the computer device 2100 may be configured to perform the steps performed by the receiving device in the embodiments corresponding to FIG. 4 and FIG. 11 to FIG. 14. For example, the central processing unit 2122 may be configured to: receive a first packet sent by the transmitting device, where the first packet corresponds to a first transaction, the first packet includes a first order flag and order auxiliary information of the first transaction, the first transaction is a transaction generated by the transmitting device based on service logic of an application, the first order flag is an order flag determined by the transmitting device for the first transaction, the order flag indicates a dependency relationship between different transactions, the order auxiliary information indicates an execution order relationship between the first transaction and n second transactions, the n second transactions are transactions that are generated by the transmitting device based on the service logic of the application and that are different from the first transaction, and sequence numbers MSNs of the n second transactions are all less than an MSN of the first transaction; and then, process the first transaction based on the first order flag and the order auxiliary information.

The central processing unit 2122 is configured to perform any step performed by the receiving device in the embodiments corresponding to FIG. 4 and FIG. 11 to FIG. 14. For specific content, refer to the description in the method embodiments described above in this application. Details are not described herein again.

An embodiment of this application further provides a computer-readable storage medium. The computer-readable storage medium stores a program for signal processing. When the program is run on a computer, the computer is enabled to perform the steps performed by the computer device in the description of the foregoing embodiments.

It should be further noted that the apparatus embodiments described above are merely examples, and units described as separate components may be or may not be physically separate. A component displayed as a unit may be or may not be a physical unit; and may be located in one place, or may be distributed in a plurality of network units. Some or all of the modules may be selected according to an actual requirement, to achieve the objectives of the solutions in embodiments. In addition, in the accompanying drawings of the apparatus embodiments provided in this application, connection relationships between modules indicate that there are communication connections between the modules, and may be specifically implemented as one or more communication buses or signal cables.

Based on the description of the foregoing implementations, a person skilled in the art may clearly understand that this application may be implemented by software in addition to necessary universal hardware, or certainly may be implemented by dedicated hardware, including a dedicated integrated circuit, a dedicated CPU, a dedicated memory, a dedicated component, and the like. Usually, any function implemented by a computer program can be easily implemented by using corresponding hardware. In addition, specific hardware structures used to implement a same function may be various, for example, an analog circuit, a digital circuit, or a dedicated circuit. However, in this application, a software program implementation is a better implementation in most cases. Based on such an understanding, the technical solutions of this application essentially or a part contributing to the conventional technologies may be implemented in a form of a software product. The computer software product is stored in a readable storage medium, for example, a floppy disk, a USB flash drive, a removable hard disk, a read-only memory (ROM), a random access memory (RAM), a magnetic disk, or an optical disc of a computer, and includes several instructions for instructing a computer device (which may be a personal computer, a training device, a network device, or the like) to perform the methods described in embodiments of this application.

All or some of the foregoing embodiments may be implemented by software, hardware, firmware, or any combination thereof. When software is used to implement the embodiments, all or some of the embodiments may be implemented in a form of a computer program product.

The computer program product includes one or more computer instructions. When the computer program instructions are loaded and executed on a computer, all or some procedures or functions in embodiments of this application are generated. The computer may be a general-purpose computer, a dedicated computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, training device, or data center to another website, computer, training device, or data center in a wired (for example, a coaxial cable, an optical fiber, or a digital subscriber line) or wireless (for example, infrared, radio, or microwave) manner. The computer-readable storage medium may be any usable medium accessible by the computer, or a data storage device, such as a training device or a data center, integrating one or more usable media. The usable medium may be a magnetic medium (for example, a floppy disk, a hard disk, or a magnetic tape), an optical medium (for example, a high-density digital video disc (DVD)), a semiconductor medium (for example, a solid state drive (SSD)), or the like.

What is claimed is:

1. A method, comprising:

determining, by a transmitting device, a first order flag for a first transaction, wherein the first order flag indicates a dependency relationship between the first transaction and another transaction, and wherein the first order flag is a bit field having a length of at least two bits; and sending, to a receiving device by the transmitting device, a first transaction packet that comprises the first order flag, wherein the first order flag is carried in a packet header of the first transaction packet, and wherein the receiving device processes the first transaction based on the first order flag.

2. The method according to claim 1, wherein the first order flag comprises at least any one of the following:

a forward dependent order flag, indicating that a current transaction cannot precede a previous transaction when being executed by the receiving device, wherein a message sequence number (MSN) of the previous transaction is less than an MSN of the current transaction;

a backward blocking order flag, indicating that the current transaction cannot be preceded by a subsequent transaction when being executed by the receiving device, wherein an MSN of the subsequent transaction is greater than the MSN of the current transaction;

a non-dependent order flag, indicating that the current transaction has neither forward dependency nor backward blocking; or a strongly dependent order flag, indicating that the current transaction has both forward dependency and backward blocking.

3. The method according to claim 2, further comprising:

determining, by the transmitting device, m candidate order flags from n second order flags, wherein each of the n second order flags is an order flag determined by the transmitting device for a second transaction, each of the m candidate order flags comprises the backward blocking order flag or the strongly dependent order flag, and $n \geq m \geq 1$; and obtaining, by the transmitting device, order auxiliary information based on an MSN of the first transaction and MSNs of m second transactions, wherein the m second transactions are in a one-to-one correspondence with the m candidate order flags, and the m second transactions are m of n second transactions.

4. The method according to claim 3, wherein obtaining, by the transmitting device, the order auxiliary information based on the MSN of the first transaction and the MSNs of the m second transactions comprises:

when $m \geq 2$, determining, by the transmitting device, a first MSN from the MSNs of the m second transactions; and using, by the transmitting device, the MSN of the first transaction and the first MSN as the order auxiliary information.

5. The method according to claim 2, further comprising:

when the first order flag is the forward dependent order flag or the strongly dependent order flag, obtaining, by the transmitting device, an MSN of each of n second transactions; and using, by the transmitting device, an MSN of the first transaction and the MSNs of the n second transactions as order auxiliary information.

6. The method according to claim 1, wherein sending, to the receiving device by the transmitting device, the first transaction packet that comprises the first order flag comprises:

encapsulating, by the transmitting device, the first order flag and order auxiliary information into the packet header of the first transaction packet; and sending, by the transmitting device, the first transaction packet to the receiving device.

7. The method according to claim 1, wherein determining, by the transmitting device, the first order flag for the first transaction comprises:

obtaining, by the transmitting device, the first transaction through a remote direct memory access (RDMA) interface, and determining, according to a specification of an RDMA protocol, a first transaction type of the first transaction; and determining, by the transmitting device based on an execution order of a transaction type specified in the RDMA protocol, the first order flag corresponding to the first transaction type.

8. The method according to claim 1, wherein after sending, to the receiving device by the transmitting device, the first transaction packet that comprises the first order flag, the method further comprises:

using, as a new first transaction by the transmitting device, a transaction newly generated based on service logic of an application;

determining another first order flag for the new first transaction, wherein the another first order flag indicates another dependency relationship between different transactions; and sending, to the receiving device by the transmitting device, a second transaction packet that comprises the another first order flag, wherein the receiving device processes the new first transaction based on the another first order flag.

9. A method, comprising:

receiving, by a receiving device, a first transaction packet sent by a transmitting device, wherein the first transaction packet comprises a first order flag, the first order flag is an order flag determined by the transmitting device for a first transaction, and the first order flag indicates a dependency relationship between the first transaction and another transaction, and wherein the first order flag is carried in a packet header of the first transaction packet, and wherein the first order flag is a bit field having a length of at least two bits; and processing, by the receiving device, the first transaction based on the first order flag.

10. The method according to claim 9, wherein the first order flag comprises at least any one of the following:

a forward dependent order flag, indicating that a current transaction cannot precede a previous transaction when being executed by the receiving device, wherein a message sequence number (MSN) of the previous transaction is less than an MSN of the current transaction;

a backward blocking order flag, indicating that the current transaction cannot be preceded by a subsequent transaction when being executed by the receiving device, wherein an MSN of the subsequent transaction is greater than the MSN of the current transaction;

a non-dependent order flag, indicating that the current transaction has neither forward dependency nor backward blocking; or a strongly dependent order flag, indicating that the current transaction has both forward dependency and backward blocking.

11. The method according to claim 10, wherein the first transaction packet further comprises order auxiliary information, and the order auxiliary information comprises at least any one of the following:

an MSN of the first transaction and MSNs of m second transactions, wherein the MSNs of the m second transactions are in a one-to-one correspondence with m candidate order flags, the m candidate order flags are determined by the transmitting device from n second order flags, the n second order flags are order flags determined by the transmitting device for the m second transactions, each of the m candidate order flags comprises the backward blocking order flag or the strongly dependent order flag, and $n \geq m \geq 1$; or when $m \geq 2$, the MSN of the first transaction and a first MSN, wherein the first MSN is an MSN determined from the MSNs of the m second transactions; or when the first order flag is the forward dependent order flag or the strongly dependent order flag, the MSN of the first transaction and an MSN of each of n second transactions.

12. The method according to claim 11, wherein processing, by the receiving device, the first transaction based on the first order flag comprises:

when the first order flag is the forward dependent order flag or the strongly dependent order flag, determining, by the receiving device based on the order auxiliary information, whether execution of each second transaction is completed; and in response to the receiving device determining that execution of each second transaction is completed, executing, by the receiving device, the first transaction.

13. The method according to claim 12, further comprising:

in response to the receiving device determining that execution of each second transaction is not completed, executing, by the receiving device, the first transaction after execution of each second transaction is completed.

14. The method according to claim 11, wherein processing, by the receiving device, the first transaction based on the first order flag comprises:

when the order auxiliary information comprises the MSN of the first transaction and the MSNs of the m second transactions, and the first order flag is the backward blocking order flag or the non-dependent order flag, determining, by the receiving device based on the order auxiliary information, whether execution of all the m second transactions is completed; and in response to the receiving device determining that execution of all the m second transactions is completed, executing, by the receiving device, the first transaction.

15. The method according to claim 14, further comprising:

in response to the receiving device determining that execution of all the m second transactions is not completed, executing, by the receiving device, the first transaction after execution of all the m second transactions is completed.

16. The method according to claim 11, wherein processing, by the receiving device, the first transaction based on the first order flag comprises:

when the order auxiliary information comprises the MSN of the first transaction and the first MSN, and the first order flag is the backward blocking order flag or the non-dependent order flag, determining, by the receiving device based on the order auxiliary information, whether execution of a target second transaction corresponding to the first MSN is completed; and in response to the receiving device determining that execution of the target second transaction is completed, executing, by the receiving device, the first transaction.

17. The method according to claim 16, further comprising:

in response to the receiving device determining that execution of a target second transaction is not completed, executing, by the receiving device, the first transaction after execution of the target second transaction is completed.

18. A computer device, comprising:

a non-transitory memory storage comprising instructions; and one or more processors in communication with the memory storage, wherein the one or more processors execute the instructions for:

determining a first order flag for a first transaction, wherein the first order flag indicates a dependency relationship between the first transaction and another transaction, and wherein the first order flag is a bit field having a length of at least two bits; and sending a first transaction packet that comprises the first order flag to a receiving device, wherein the first order flag is carried in a packet header of the first transaction packet, and wherein the receiving device processes the first transaction based on the first order flag.

19. The method according to claim 1, further comprising:

obtaining, by the transmitting device, order auxiliary information of the first transaction, wherein the order auxiliary information indicates an execution order relationship between the first transaction and n second transactions, the n second transactions are transactions that are generated by the transmitting device based on service logic of an application and that are different from the first transaction, message sequence numbers (MSNs) of the n second transactions are all less than an MSN of the first transaction, and $n \geq 1$.

20. The method according to claim 9, wherein processing, by the receiving device, the first transaction based on the first order flag comprises:

when execution of a previous transaction on which the first transaction depends is completed based on the first order flag, executing, by the receiving device, the first transaction.

* * * * *